US012747106B2

(12) United States Patent
Pechyoni et al.

(10) Patent No.: US 12,747,106 B2
(45) Date of Patent: Sep. 29, 2026

(54) ITEM PROCESSING SYSTEMS AND METHODS EMPLOYING PARAMETER EXPLORATION

(71) Applicant: Berkshire Grey Operating Company, Inc., Bedford, MA (US)

(72) Inventors: Dimitry Pechyoni, Newton, MA (US); Christopher Geyer, Arlington, MA (US); Lev Grossman, Newton, MA (US)

(73) Assignee: Berkshire Grey Operating Company, Inc., Bedford, MA (US)

( * ) Notice: Subject to any disclaimer, the term of this patent is extended or adjusted under 35 U.S.C. 154(b) by 435 days.

(21) Appl. No.: 18/218,318

(22) Filed: Jul. 5, 2023

(65) Prior Publication Data

US 2024/0010430 A1 Jan. 11, 2024

Related U.S. Application Data

(60) Provisional application No. 63/358,310, filed on Jul. 5, 2022.

(51) Int. Cl.
*B65G 1/137* (2006.01)
*B65G 43/00* (2006.01)
*G06Q 10/08* (2024.01)

(52) U.S. Cl.
CPC ........... *B65G 1/1373* (2013.01); *B65G 43/00* (2013.01); *G06Q 10/08* (2013.01); *B65G 2203/02* (2013.01)

(58) Field of Classification Search
CPC .. B65G 1/1373; B65G 43/00; B65G 2203/02; G06Q 10/08
See application file for complete search history.

(56) References Cited

U.S. PATENT DOCUMENTS 3,968,888 A * 7/1976 Van Vliet ............ B65G 1/0421 414/273
4,800,703 A * 1/1989 Goodman .............. B65B 35/38 53/538
5,595,263 A 1/1997 Pignataro
6,076,023 A 6/2000 Sato
(Continued)

FOREIGN PATENT DOCUMENTS

CN 103647686 A 3/2014
CN 107341635 A 11/2017
(Continued)

OTHER PUBLICATIONS

Wald, et al., Ann. Math. Statist. 16(2): 117-186 (Year: 1945).*
(Continued)

*Primary Examiner* — Ernesto A Suarez
*Assistant Examiner* — Laurence R Brothers
(74) *Attorney, Agent, or Firm* — Gesmer Updegrove LLP

(57) ABSTRACT

A control system is disclosed for an item processing system with a programmable motion device, said control system including a parameter estimator for estimating item handling parameters for items for which at least some parameters are known, a parameter explorer for identifying item handling parameters of items for which no parameters are known, and a parameter governor for determining whether to employ the parameter estimator or the parameter explorer in adjusting parameters for the item processing system.

26 Claims, 22 Drawing Sheets

(56) References Cited

U.S. PATENT DOCUMENTS

| | | | | |
|---|---|---|---|---|
| 7,650,982 | B2 | 1/2010 | Tachibana et al. | |
| 9,738,455 | B2 * | 8/2017 | Neiser | B65G 43/08 |
| 10,265,872 | B2 | 4/2019 | Wagner et al. | |
| 10,385,522 | B1 | 8/2019 | Ellwein et al. | |
| 10,407,844 | B1 | 9/2019 | Nelson et al. | |
| 10,853,757 | B1 | 12/2020 | Hill et al. | |
| 2003/0029946 | A1 | 2/2003 | Lieber et al. | |
| 2010/0241260 | A1 | 9/2010 | Kilibarda et al. | |
| 2013/0034266 | A1 * | 2/2013 | Shamir | G06F 18/256 382/103 |
| 2013/0345872 | A1 | 12/2013 | Brooks et al. | |
| 2014/0195979 | A1 | 7/2014 | Branton et al. | |
| 2014/0364998 | A1 | 12/2014 | Neiser et al. | |
| 2016/0274586 | A1 | 9/2016 | Stubbs et al. | |
| 2018/0059231 | A1 * | 3/2018 | Dewberry | G01S 13/878 |
| 2020/0094288 | A1 | 3/2020 | Coupar et al. | |
| 2020/0130935 | A1 * | 4/2020 | Wagner | B65G 1/1371 |
| 2020/0401125 | A1 | 12/2020 | Hirsch | |
| 2021/0163235 | A1 | 6/2021 | Mzzaro et al. | |
| 2021/0173603 | A1 | 6/2021 | Collet et al. | |
| 2021/0292100 | A1 | 9/2021 | Schroader et al. | |
| 2022/0138214 | A1 | 5/2022 | Hattabaugh et al. | |
| 2025/0265264 | A1 | 8/2025 | Hattabaugh et al. | |

FOREIGN PATENT DOCUMENTS

| | | | | |
|---|---|---|---|---|
| CN | 111079896 | A * | 4/2020 | G06N 7/01 |
| CN | 116583857 | A | 8/2023 | |
| CN | 119452384 | A | 2/2025 | |
| EP | 2233400 | B1 | 9/2010 | |
| JP | H1015788 | A * | 1/1998 | |
| WO | 2018195488 | A1 | 10/2018 | |
| WO | 2019090264 | A1 | 5/2019 | |
| WO | 2022094040 | A1 | 5/2022 | |
| WO | 2024010799 | A1 | 1/2024 | |

OTHER PUBLICATIONS

Notification Concerning Transmittal of International Preliminary Report on Patentability and the International Preliminary Report on Patentability issued by the International Bureau of WIPO in related international application No. PCT/US2023/026916 on Jan. 16, 2025, 9 pages.

Notification of Transmittal of the International Search Report and the Written Opinion of the International Searching Authority and the International Search Report and Written Opinion issued by the International Searching Authority, the European Patent Office, in related International Application No. PCT/US2023/026916 on Oct. 17, 2023, 13 pages.

International Search Report and Written Opinion issued by the European Patent Office, as the International Searching Authority, in related International Application No. PCT/US2021/056998 on Feb. 28, 2022, 15 pages.

Notification Concerning Transmittal of International Preliminary Report on Patentability and the International Preliminary Report on Patentability issued by the International Bureau of WIPO in related International Application No. PCT/US2021/056998 on May 11, 2023, 9 pages.

* cited by examiner

ITEM PROCESSING SYSTEMS AND METHODS EMPLOYING PARAMETER EXPLORATION

PRIORITY

The present application claims priority to U.S. Provisional Patent Application No. 63/358,310 filed Jul. 5, 2022, the disclosure of which is hereby incorporated by reference in its entirety.

BACKGROUND

The invention generally relates to item processing systems and relates, in particular, to item processing systems such as automated storage and retrieval systems, distribution center systems, and sortation systems that are used for processing a variety of items using automated item processing equipment for handling a wide variety of items.

Current item processing systems generally involve the processing of a large number of items, where the items are received in either organized or disorganized batches, and must be routed to desired destinations in accordance with a manifest or specific addresses on the items (e.g., in a mailing system).

Automated storage and retrieval systems (AS/RS), for example, generally include computer-controlled systems for automatically storing (placing) and retrieving items from defined storage locations. Traditional AS/RS typically employ totes (or bins), which are the smallest unit of load for the system. In these systems, the totes are brought to people who pick individual items out of the totes. When a person has picked the required number of items out of the tote, the tote is then re-inducted back into the AS/RS.

Current distribution center sorting systems, for example, generally assume an inflexible sequence of operations whereby a disorganized stream of input items is first singulated into a single stream of isolated items presented one at a time to a scanner that identifies the item. An induction element (e.g., a conveyor, a tilt tray, or manually movable bins) transport the items to the desired destination or further processing station, which may be a bin, an inclined shelf, a chute, a bag or a conveyor, etc.

In typical parcel sortation systems, human workers or automated systems typically retrieve parcels in an arrival order, and sort each parcel or item into a collection bin based on a set of given heuristics. For instance, all items of like type might go to a collection bin, or all items in a single customer order, or all items destined for the same shipping destination, etc. The human workers or automated systems are required to receive items and to move each to their assigned collection bin. If the number of different types of input (received) items is large, a large number of collection bins is required.

Certain current state-of-the-art sortation systems rely on human labor to some extent. Most solutions rely on a worker that is performing sortation, by scanning an item from an induction area (chute, table, etc.) and placing the item in a staging location, conveyor, or collection bin. When a bin is full or the controlling software system determines that it needs to be emptied, another worker empties the bin into a bag, box, or other container, and sends that container on to the next processing step. Such a system has limits on throughput (i.e., how fast can human workers sort to or empty bins in this fashion) and on number of diverts (i.e., for a given bin size, only so many bins may be arranged to be within efficient reach of human workers).

Certain automated processing systems rely on known processing parameters regarding items to be grasped, for example, by a robotic system, and then moved to another location. These known processing parameters may include weight, dimensions, and packaging materials. As a goal of such systems is to properly handle all items within a defined input set (e.g., without dropping items), automated processing parameters are generally set to be conservative (ensuring sufficient grasp of a single item and setting a movement speed that is safe). Again, however, such a system has limits on throughput and number of diverts. While scaling provides more processing stations to increase throughput, the number of diverts may be required to scale with the number of processing stations.

Adding to these challenges are the conditions that some items may have information about the item entered into the manifest or a shipping label incorrectly. For example, if a manifest in a distribution center includes a size or weight for an item that is not correct (e.g., because it was entered manually incorrectly), or if a shipping sender enters an incorrect size or weight on a shipping label, the processing system may reject the item as being unknown. Additionally, and with regard to incorrect information on a shipping label, the sender may have been undercharged due to the erroneous information, for example, if the size or weight was entered incorrectly by the sender.

There remains a need for a more efficient and more cost-effective item processing systems that process items of a variety of sizes and weights into appropriate collection bins or boxes, yet is efficient in handling items of such varying sizes and weights.

SUMMARY

In accordance with an aspect, the invention provides a control system for an item processing system with a programmable motion device. The control system includes a parameter estimator for estimating item handling parameters for items for which at least some parameters are known, a parameter explorer for identifying item handling parameters of items for which no parameters are known, and a parameter governor for determining whether to employ the parameter estimator or the parameter explorer in adjusting parameters for the item processing system.

In accordance with another aspect, the invention provides an item processing system including a programmable motion device, and a control system including a parameter governor adjusting parameters for the item processing system using any of a parameter estimator for estimating item handling parameters for items for which at least some parameters are known, and a parameter explorer for identifying through exploration item handling parameters for adjustment, and for adjusting at least one item handling parameter provided by the parameter estimator.

In accordance with a further aspect, the invention provides a method of processing items with a programmable motion device. The method includes providing a parameter estimator for estimating item handling parameters of items for which at least some parameters are known, providing a parameter explorer for identifying item handling parameters of items for which no item handling parameters are known or for identifying through exploration item handling parameters for adjustment, and for adjusting at least one item handling parameter provided by the parameter estimator, and employing a parameter governor for determining whether to adjusts parameters for the item processing system using the parameter estimator or the parameter explorer.

BRIEF DESCRIPTION OF THE DRAWINGS

The following description may be further understood with reference to the accompanying drawings in which.

Figure 1:
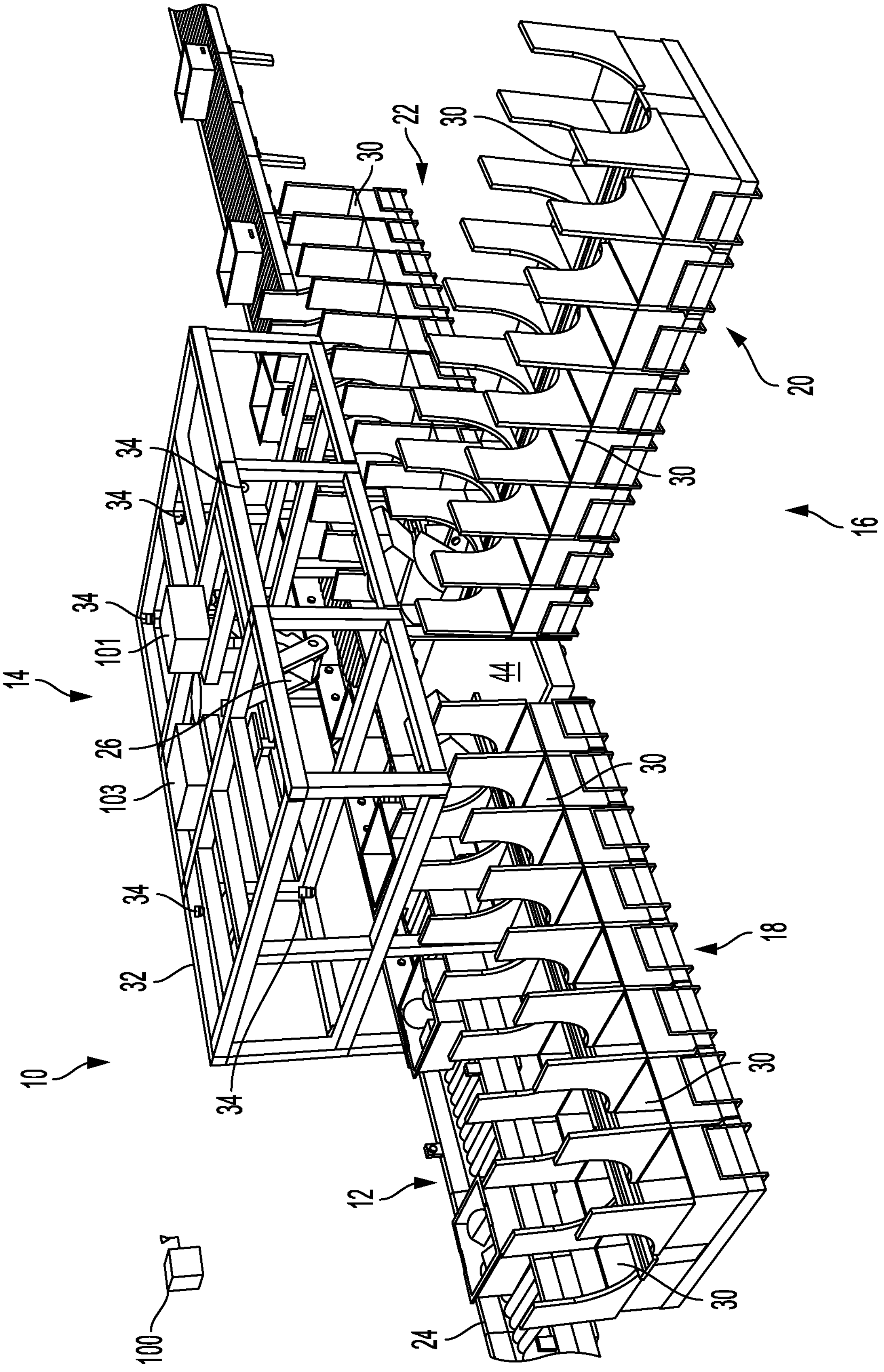
FIG. 1 shows an illustrative diagrammatic view of an item processing system in accordance with an aspect of the present invention.

The drawings are shown for illustrative purposes only.

DETAILED DESCRIPTION

Automated item processing systems generally include programmable motion devices (e.g., robots) that receive intake material, and process the material in accordance with robotic handling parameters. Robotic material handling is governed by many choices (or parameters) in the running of a system and/or performing an action. When a robot manipulates its environment such as picking up an item, e.g., a SKU (stock keeping unit) for e-commerce or store distribution, there is an outcome that might be good or bad. The probability of a good outcome can depend on the chosen parameters and on the items being handled. In accordance with an aspect of the invention, an objective is for the system to learn from good and bad outcomes what are good or bad parameters for given items, so that over time the system may optimize its performance in feedback cycles.

During automated item processing, data of results of the processing of items is recorded as associated with a set of robotic material handing parameters. After a robot has completed a set of actions, data of results are recorded associated with material handling parameters used in the item processing. Machine learning tools may be used to develop model(s) that determine the best values of planning parameters. The machine learning model(s) may preferably be based on sequential hypothesis testing of a variable sample size rather than iterative optimization methods. This is done by a Parameter Estimator that estimates optimal processing parameters based on known performance data. The known performance data may be provided, for example, in initial evaluations.

The performance of the Parameter Estimator is limited however, by the sets of actions that are initially evaluated. There may be an optimal parameter, but if the parameter estimator is not fed performance data around this operating parameter, it will never propose the optimal parameter, since the optimal parameter is outside the range of its experience or training set. In accordance with various aspects, the systems and methods of the invention provide a generator of the initial choices in the absence of great information about what the good initial choices are. Potentially optimal parameters are proposed before any such parameters may have been executed, and therefore are outside the training set. A function of the Parameter Explorer is to put forth parameters outside of the training set. The decision of whether to extract parameters from the Parameter Estimator or the Parameter Explorer must be made automatically and on the basis of various states of information. The Parameter Governor makes these determinations through a feedback process and decides if there is a need to acquire new information by using the Parameter Explorer, or if there is enough certainty in parameters to employ the Parameter Estimator. At the end of each action, the robot application detects the result (e.g., successful or some kind of fault such as drop, multi-pick or mis-pick) and stores this information in a database. The action results are sent to the Parameter Governor and thus close the feedback cycle.

The Parameter Governor may acquire new information in order to attain the following short-term and long-term information acquisition objectives. With regard to the short-term information acquisition objects, the Parameter Governor may decide that there is an insufficient amount of information about the picking performance of a particular SKU, for example, and may therefore decide that exploration is required. No information about the size or weight of the SKU may be available with certainty, and the matching of any viable parameters may not be initially known. So, that information must be acquired through the act of picking by testing multiple parameters proposed by the Parameter Explorer.

With regard to the long-term information acquisition objective, the robot cell may be operating nominally across a wide range of parameters and SKUs, but it may be an aim of operations to improve performance over time by probing new parameters that may increase its system performance. The Parameter Governor may employ the Parameter Explorer in those cases where it has decided to incrementally and conservatively increase speed. It might do so only in the context of otherwise reliable and acceptable recent history of performance, such that the risk of error can be acceptably absorbed. Conversely, if the robot cell has made a number of errors recently, then the Parameter Governor may decide to only employ more conservatively chosen parameters from the Parameter Estimator, in order to meet service level agreements. Operable constraints that may be present include safety, reliability and speed.

In accordance with various aspects, therefore, the invention provides systems and methods for optimizing handling parameters for a robotic material handling system. The systems and methods govern the choice of whether for the next task to rely on a machine-learning based model of performance, or to explore the parameter space to find good parameters. Exploration may be chosen, for example, where there is a lack of information about properties of the item. The decision to use exploration may be made based on the history of the previous handling with the given item, or on other factors such as a history of operational performance. Exploration is chosen when there is a lack of history of handling with the item, and/or a lack of information about properties of the item that if known, would better inform parameter choices. The system may perform exploration in a hybrid parameter space, using mixed continuous and discrete parameters.

The systems and methods may also perform exploration when properties about an item that affect its handling (e.g., weight and dimensions) are unknown, and during its exploration it is estimating both these handling properties and good properties for the item. In some applications, the systems and methods determine whether the result is to not handle the item at all. The system may optimize performance metrics (e.g., throughput) over time, while keeping other metrics like uptime within a service level agreement (SLA). The system may start handling an item in a state that might not be performant according to some requirements, but implement a strategy to either become performant at the task with the item (meets thresholds) or come to the determination that the item cannot be handled in a performant manner and therefore should be flagged as being automation ineligible. The system collects data and performs sequential hypothesis testing (e.g., using Bayesian optimization) on sets of data. The optimization process operates concurrent with the operation of the robotic system or systems, and provides data throughout the grasping, moving (trajectory) and placement operations. The system hastens learning by gathering item properties and good parameters learned by multiple running systems or multiple sites; the system then shares the learned parameters across multiple cells and sites. The system is applicable to a variety of robotic material handling tasks.

Systems and methods of aspects of the invention may be used with a variety of item handling systems such as robotic articulated arm systems and shuttle systems in warehouses that process a variety of items including discrete items as well as cases of discrete items. Such item handling systems may include, for example, sortation, distribution, store replenishment, and fulfilling e-commerce orders at an order fulfillment center. For store replenishment, the distribution center holds an inventory of goods that need to be individually distributed to multiple stores. In e-commerce order fulfillment, items are taken from an inventory of items and are placed into shipping boxes or bags for delivery by the shipper to the consumer. In each of these operations, robots are handling individual items or SKUs.

FIG. 1 for example shows an item processing system 10 in which system and methods of aspects of the invention may be employed. There are a great variety of handling tasks to which systems of the invention may be applicable, some permutations of which are presented herein. A brief summary includes: a variety of Tasks with task-specific parameters that may be controlled by the robot and that affect performance, a variety of Latent or unknown properties of the handled items that can affect performance, Faults, including a variety of physical/real world problems can go wrong in each of the tasks, like dropping an item, and these faults are captured by sensors and algorithms processing sensor data to infer physical problems, and a variety of objectives, ways to measure performance such as speed or uptime or a combination of multiple metrics that the system is configured to optimize automatically by feedback process, providing that the system may satisfy an SLA.

As shown in FIG. 1, the item processing system 10 includes an input conveyance system 12, an item processing station 14, and a distribution system 16 that includes, for example, a plurality of shuttle wing systems 18, 20, 22. The input conveyance system 12 includes an input conveyor 24 on which items (e.g., discrete items, items in open totes or bins, or containers for processing that contain items) are presented to the item processing station 14. The item processing station 14 includes, for example, a programmable motion device 26 such as an articulated arm of a robotic system with an end effector 28 for grasping the item for transport to any of a plurality of destination locations 30 of the shuttle wing systems 18, 20, 22. The robotic system may be suspended from a support structure 32 that includes a plurality of perception systems 34 for monitoring the input of items as well as the grasping and transfer of items by the end-effector 28 including a vacuum cup 29 as further shown in FIG. 2. The operation of the system may be controlled by one or more computer processing systems 100, 101 as discussed further herein. High flow vacuum may be provided to the end-effector 28 from a high flow vacuum source 103, e.g., providing flow of at least about 100 cubic feet per minute (e.g., 130-140 cubic feet per minute), and the vacuum pressure provided by the high flow vacuum source may be no more than about 25,000 Pascals below atmospheric in some examples, and no more than about 50,000 Pascals below atmospheric in other examples.

Figure 2:
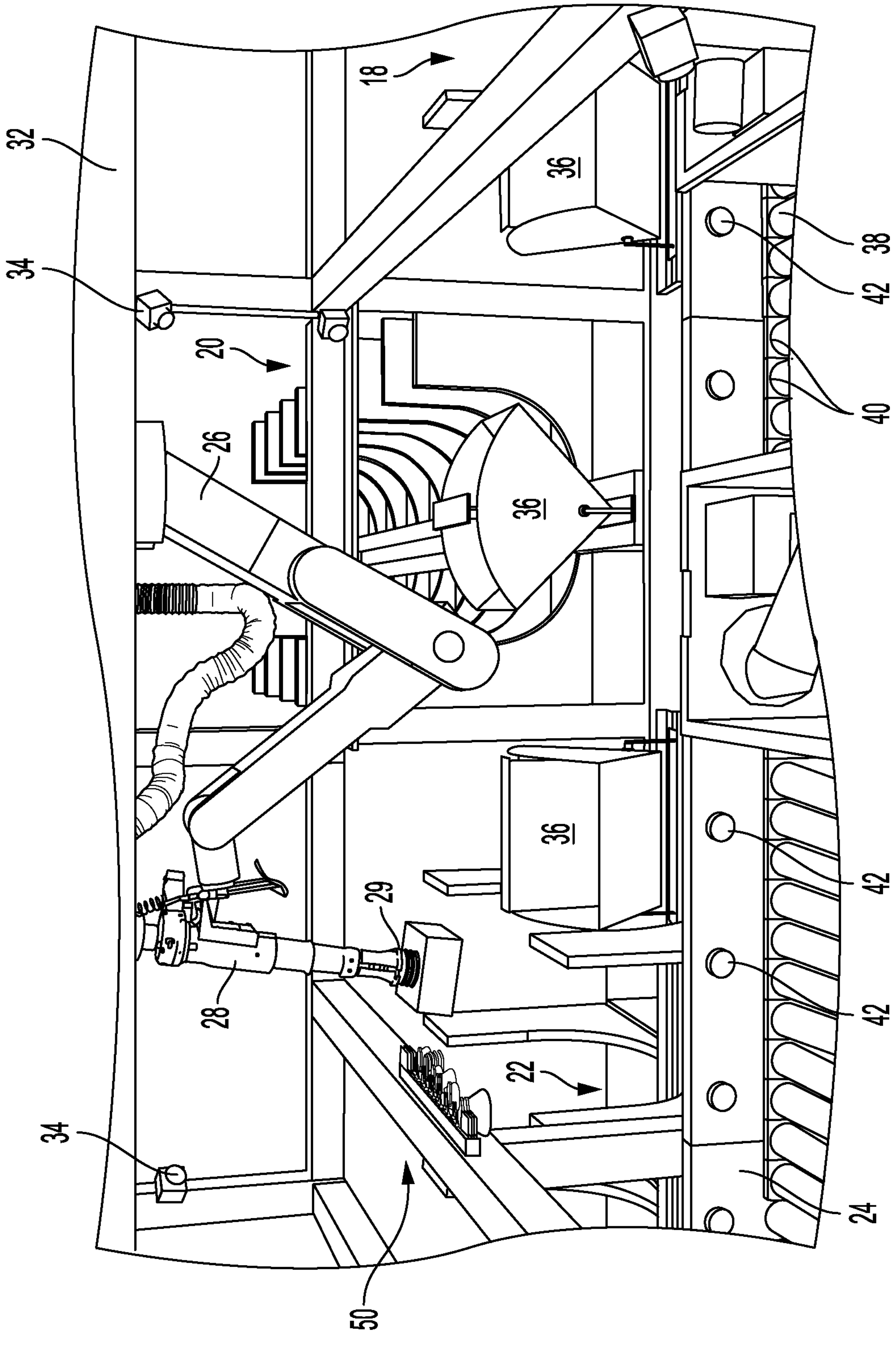
FIG. 2 shows an illustrative diagrammatic enlarged side view of a portion of the item processing station in the item processing system of FIG. 1.
Figure 3:
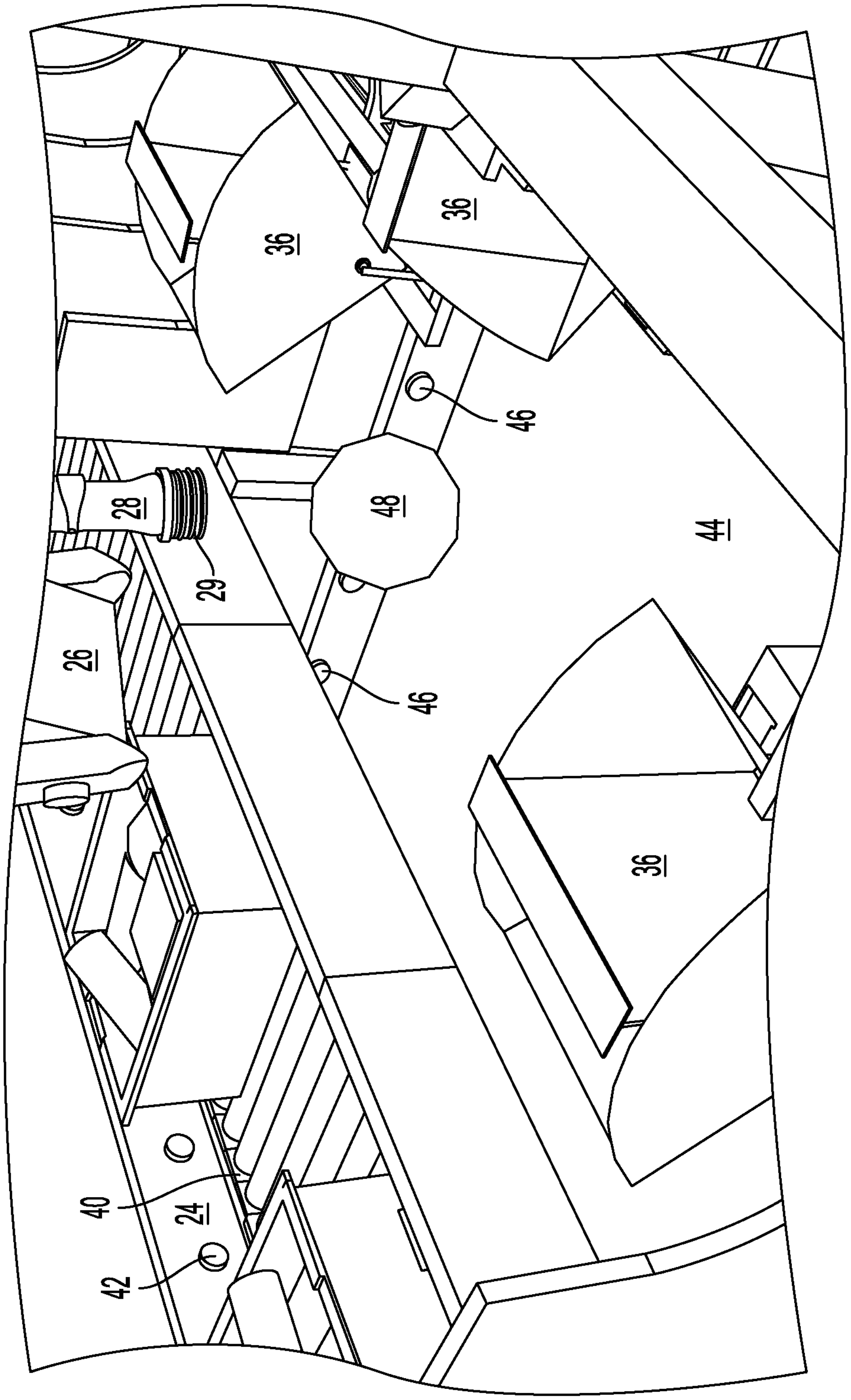
FIG. 3 shows an illustrative diagrammatic further enlarged view of the end-effector of the item processing station of FIG. 2 dropping an item.
Figure 9:
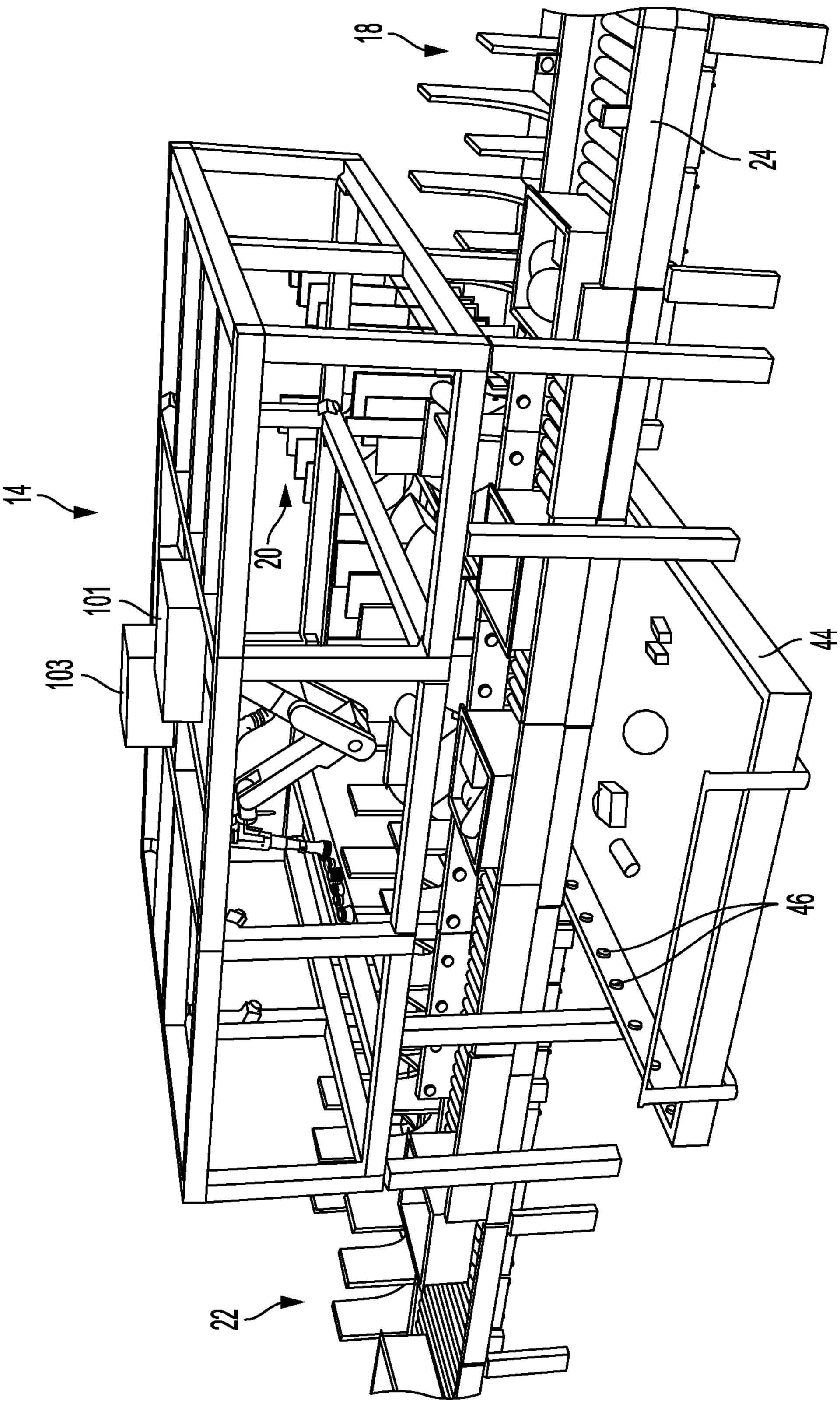
FIG. 9 shows an illustrative diagrammatic view of an item processing system in accordance with a further aspect that includes a removable catch floor.
Figure 10:
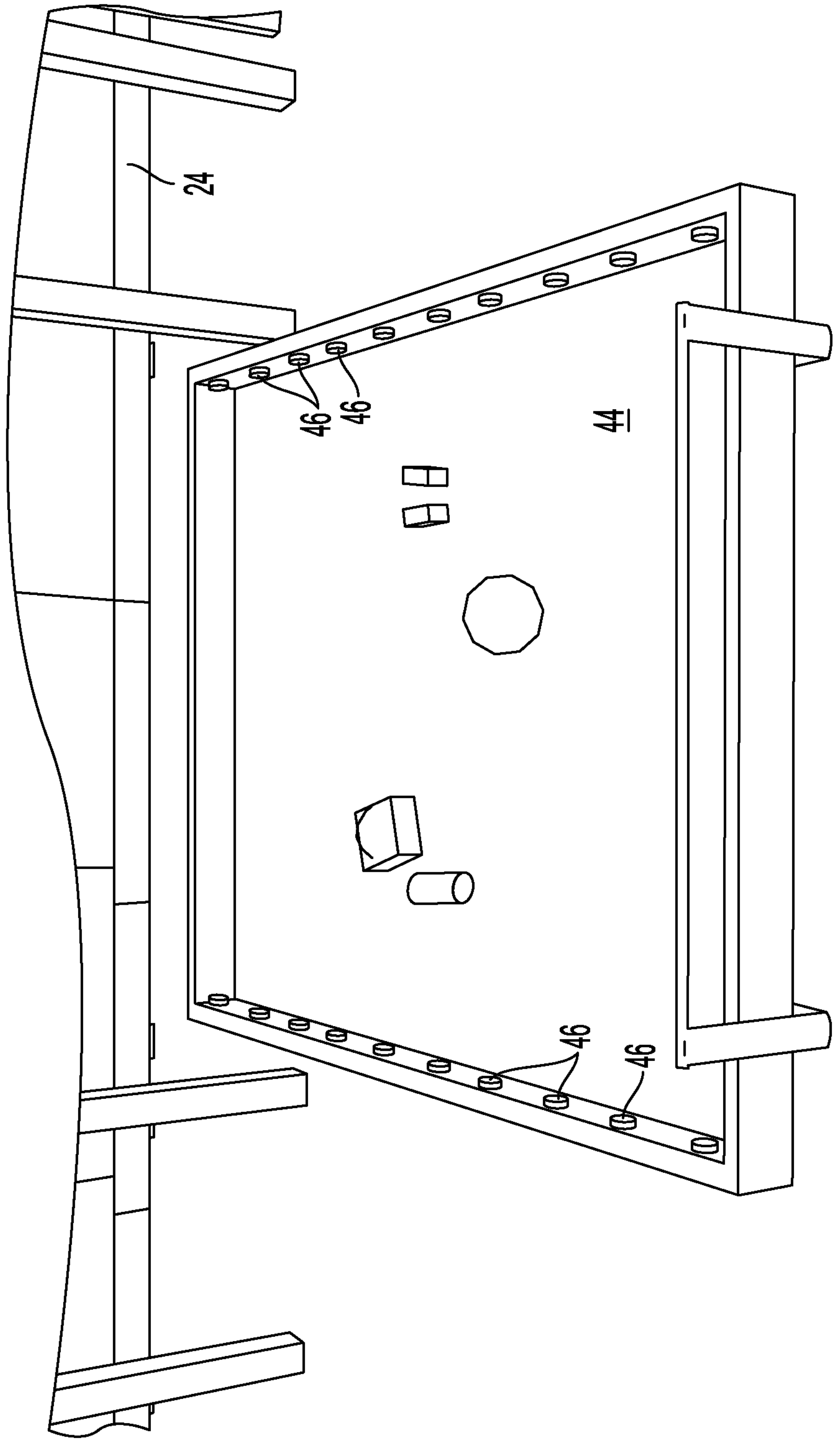
FIG. 10 shows an illustrative diagrammatic view of the removable catch floor of FIG. 9 pulled out.

The system may be designed to accommodate faults in item processing, such as poor grasps by the end-effector, grasps of multiple items, changing (failing) grasps of an item, and item drops, as the system explores various different item handling parameters. FIG. 2 shows an enlarged view of the item processing station 14 (with portions of the support structure 32 removed for clarity), showing an item being moved to one of a plurality of divided carriages 36 of the shuttle wing systems 18, 20, 22. The input conveyor 24 includes rollers 38 mounted on torque sensors or load cells 40 for monitoring weight of each bin or tote as items are removed, as well as for detecting whether an item had been dropped onto the rollers 38. Additionally, the system includes perception system 42 for detecting whether an item has been dropped onto the rollers 38. As further shown in FIG. 3, a removable catch floor 44 (as also shown in FIGS. 9 and 10) is also provided to catch any items (e.g., 48 as shown in FIG. 3) that fall from the end effector (accidently or intentionally), and perception units 46 are provided in the removable catch floor to monitor/confirm that each item is received within the catch floor 44.

Different parameters may be selectable and adjustable by the automated system for grasping items, transporting items, and placing/packing items, as well as identifying items and case decanting. For example, grasping may involve picking an item from a conveyor, tote or box with a gripper for transport to another location in the robot's work environment. The gripper may be vacuum-based, or may be based on some other kind of gripping system. Adjustable parameters for the grasping task may include a speed of the robot arm during picking and movement, choice of end-effector or vacuum cup, vacuum pressure, and vacuum flow (where such choices are available). For example, vacuum cup change may be provided as a function of drop probability. Adjustable parameters may also include parameters that affect perception processes that generate grasp candidate locations using depth and image sensor data. Adjustable parameters may further include thresholds and other parameters that affect behavior during initial movement of the item such as the pressure threshold below which a grip is assumed to be lost. Adjustable parameters may further include controllable parameters of a motion planning system other than speed, such as those that might change depending on whether the item tends to sway, or is deformable. Adjustable parameters may further include parameters of grasp selection strategies, such as whether to choose one of many grasping strategies, or whether to supply as input additional parameters for interpreting image and depth-based data to determine grasp points.

Adjustable parameters for the transporting task may include transporting an item with a shuttle system from a location where the item is received to a point where it is ejected either by tipping a bucket, or by conveying in one direction or another because the carrier is a cross-belt conveyor. Such parameters may include the speed of the transport in one or more of its axes (1-axis: e.g., just horizontal; 2-axis: horizontal and vertical), as well as the speed of ejection by tipping or conveyance, depending on the carrier ejection mechanism.

Adjustable parameters relating to the packing task may include packing an item picked by a robot arm into a shipping box or other container such as a tote. Such parameters may include the margins (spacing) to leave around either the item to be placed, or the items that may already be inside the container, as well as adjustable parameters of a motion planning system other than speed, such as those that might impact how to controllably re-orient the item for packing.

Adjustable parameters relating to the identification task may include identifying the item in order to sort it by presenting it in successively different orientations to a barcode or RFID scanner; or by orienting and releasing the item to a drop scanner with barcode or RFID scanners; or by employing visual or geometric features of the item to identify it. Such parameters may include parameters affecting the choice of orientation for presentation or release.

Adjustable parameters relating to the case decanting task may include manipulating a tote with a gripper or other electromechanical system decanting units from cardboard cases into totes, for storage in an AS/RS, for instance. Such parameters may include parameters of the motion by which the case is decanted, including the amplitudes or frequencies of vibratory motions.

The above may apply to many different automated material handling tasks where there is complexity in decision making and actions are repeated. As herein described, the set of parameters for a chosen task is denoted as X.

The properties of items may include a variety of characteristics that impact material handling yet may not be immediately apparent, including for example, weight, dimensions, geometric modeling, internal weight distribution and inertia, characteristics of packaging such as carboard, bagged, plastic, carboard with plastic window(s), and combinations thereof. Such characteristics may further include mechanical characteristics such as whether the item is rigid, easily deformable (bagged clothing), contains liquids that jostle, is rollable, has porosity, as well as the item's manufacturer and general category (such as small electronics, food item, toy, etc.). These properties and characteristics may or may not be provided by warehouse management systems (WMS) and database systems to the robotic system. For example, a warehouse database may or may not contain weight and dimensions, and if it does, these properties may be incorrect, they may have small but impactful errors, or the item type may have the property that there is a large amount of variation between different instances of the type of item.

All of the latent properties listed above may be discovered during the handling of items with varying degrees of certainty. Weight may be inferred from scales; dimensions and geometric models may be inferred from 3D scanners; internal weight may be inferred during handling; packaging characteristics may be perceived visually; manufacture information may be inferred from OCR of text on the item; and category may be perceived using machine vision.

The impact of a bad choice of parameters depends on the task. The occurrence of a fault is a signal that the system uses to train the system to avoid the given parameter. The system must be able to detect these faults in order to automatically execute a feedback process that eventually improves performance and finds a good parameter that is more fault-free than alternate parameters.

Figure 4A:
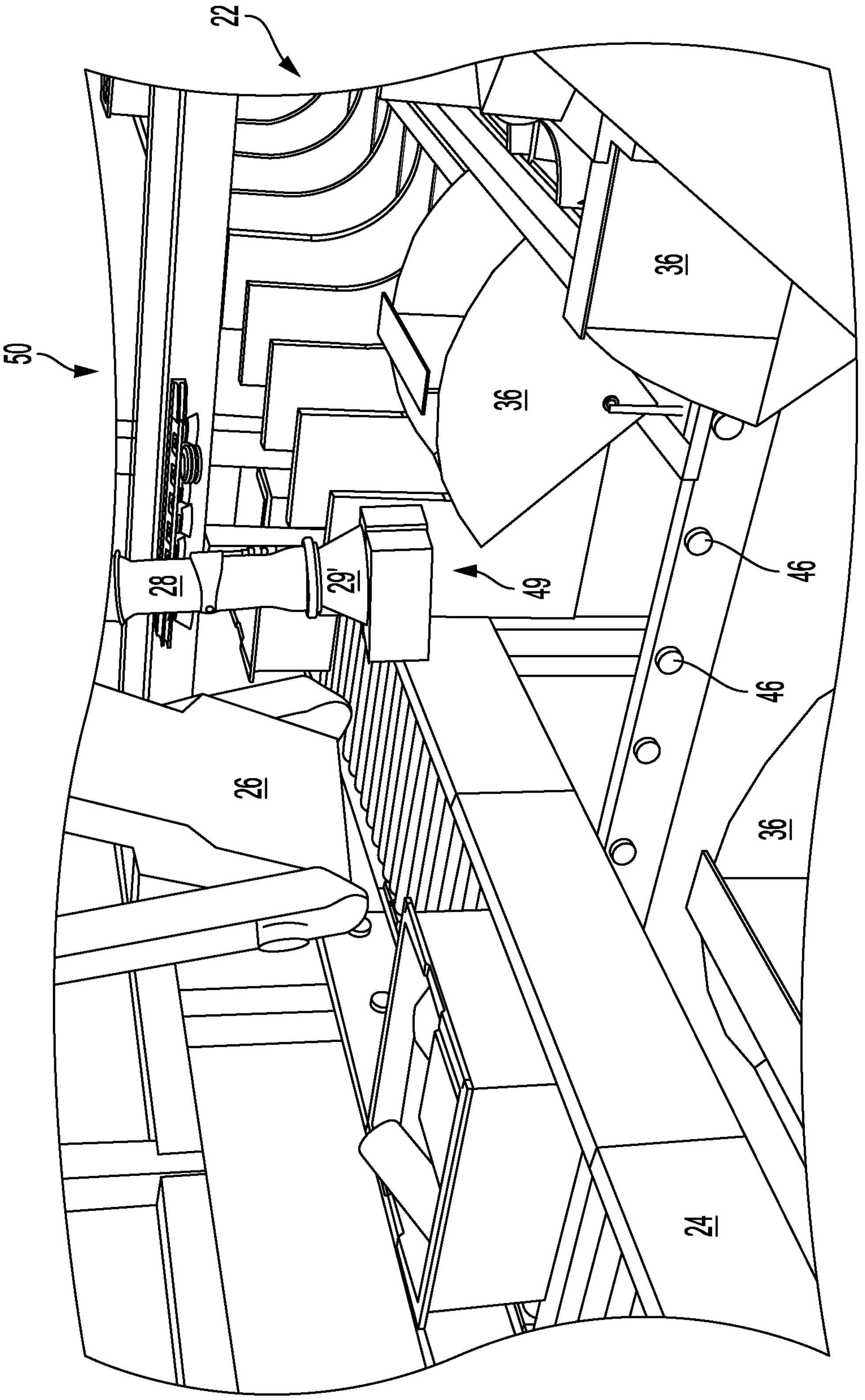
FIGS. 4A and 4B show illustrative diagrammatic views of a portion of the item processing station of FIG. 2 grasping plural items (FIG. 4A) and dropping the plural items (FIG. 4B)
Figure 4B:
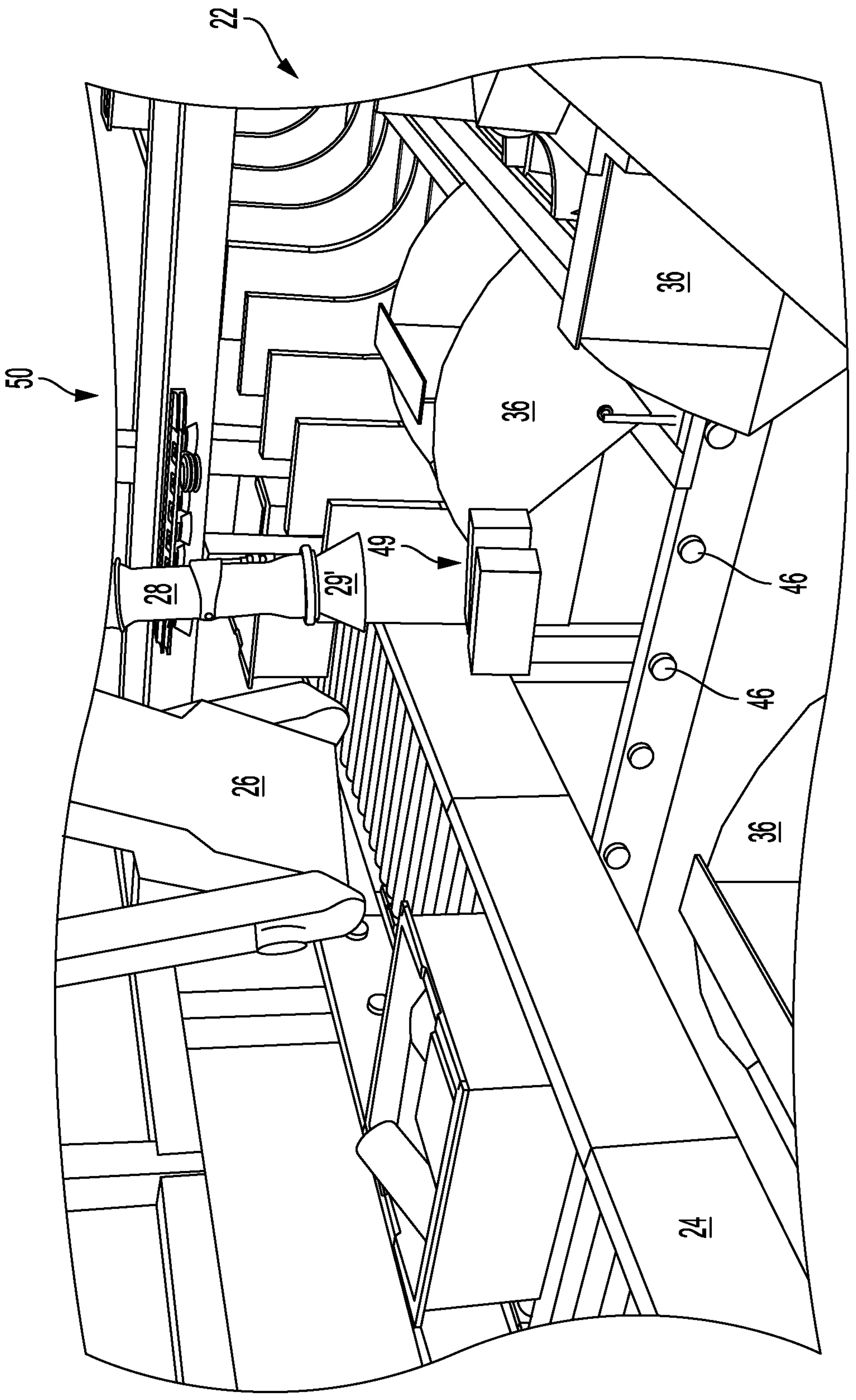
Figure 5A:
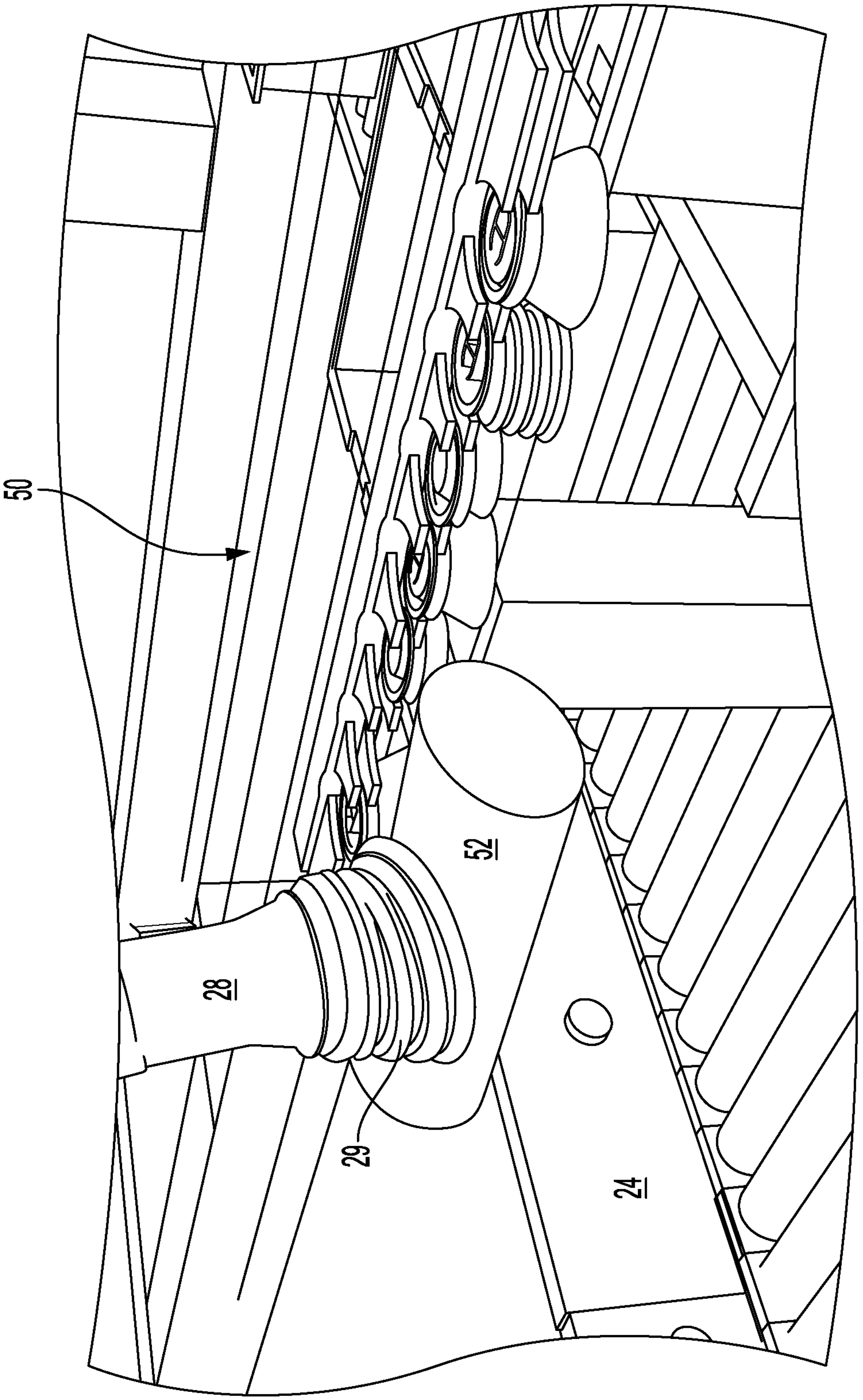
FIGS. 5A and 5B show illustrative diagrammatic views of a portion of the item processing station of FIG. 2 with a poor grasp on an item (FIG. 5A) and dropping the poorly grasped item (FIG. 5B)
Figure 5B:
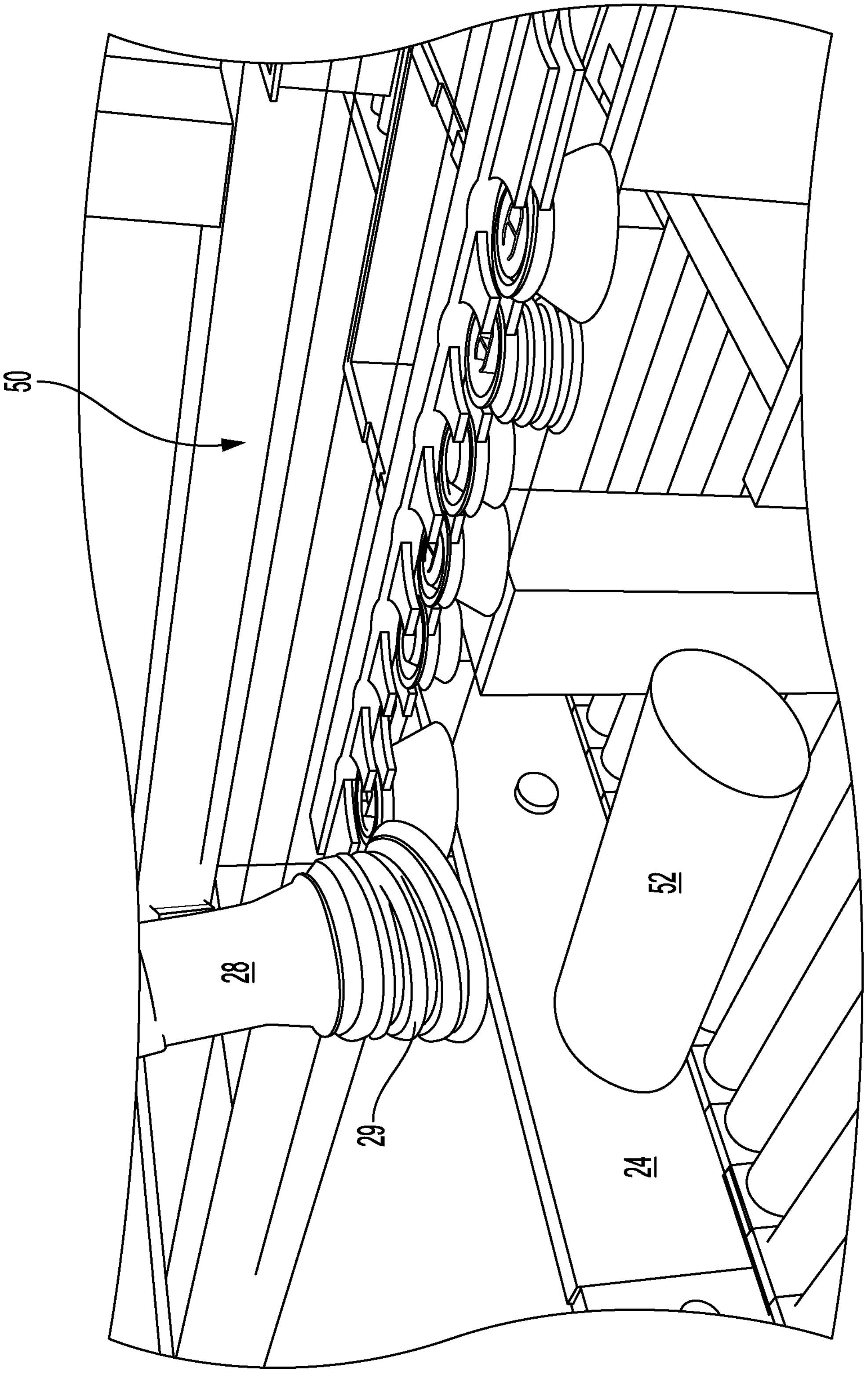

In accordance with an aspect, systems and methods of the invention provide for a variety of faults to occur within a controlled environment that both detects the fault and is not adversely affected by the fault in connection with the processing of other items. Examples of faults and mechanisms the robotic system may use to detect the faults are presented herein. For example, with regard to grasping tasks, detected faults may include 1) dropping an item as detected by loss of vacuum detected by pressure sensors or failure of mass conservation check by scales where one or more scale measurements at one or more sites are fused to infer the possibility of an incomplete transfer, 2) multi-pick- or picking more than one item when only one item is intended to be picked (by detecting using scales detecting a larger than expected eight difference implying that more than one item was lifted from the pick area, 3) a torque fault reported by the robotic system (e.g., due to a collision in the robotic environment as reported by the robotic system, 4) conveyor-jam fault as may be detected by the conveyor sub-system that reports inconsistent tracking, which implies a conveyor jam, 5) source or destination container overfull fault as detected by a container scanner that infers from depth imagery that item exceed or over-hang a maximum height, 6) motion planning failure fault as detect by an application reports inability to find a plan for the robotic system that achieves the operating objectives, 7) inability to see an item fault as detected by a grasp selection system that reports no grasps found, despite a WMS request order from a container, and 8) an excessive force applied to item fault that is likely to cause damage, as detected by scales reporting excessive load during a pick or place operation. FIG. 4A for example, shows the system 10 with the vacuum cup 29' of the end-effector 28 grasping a multi-pick as shown at 49. When the system detects the multi-pick, it may discharge both items 49 into the removable catch floor 44 as shown in FIG. 4B. FIG. 5A for example, shows the system 10 with the vacuum cup 29 of the end-effector 28 with a poor grasp on an item 52. When the system detects the poor grasp, it may discharge the item 52 into the removable catch floor 44 as shown in FIG. 5B.

Figure 6:
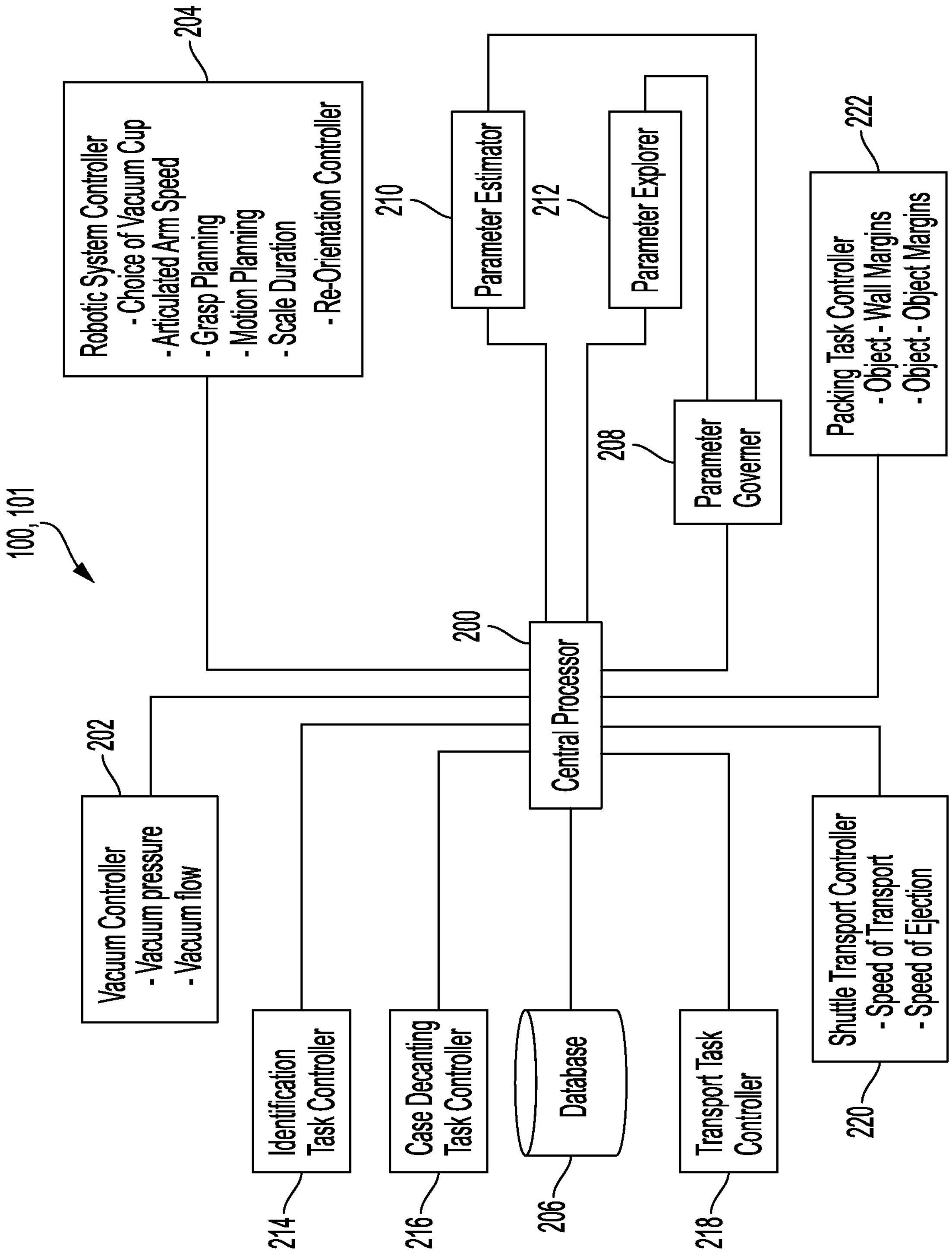
FIG. 6 shows a functional block diagram of the control system for use in the system of FIG. 1 in accordance with an aspect of the present invention.

FIG. 6 shows a functional block diagram of the one or more computer control systems 100 for controlling the operation of the system. In particular, the system(s) 100 includes a central processor system 200 that is in communication with a vacuum controller 202 that controls, for example, vacuum pressure and vacuum flow, and a robotic system controller 204. The robotic control system 204 controls a vacuum cup determination system, an articulated arm movement speed system, a grasp planning system, a motion planning system, a scale duration system, and a re-orientation controller. The central processor 200 is also coupled to a storage database 206 as well as a Parameter Governor 208. The Parameter Governor 208 controls inputs from the Parameter Estimator 210 and the Parameter Explorer 212, which are also coupled to the central processor 200. The central processor 200 is also coupled to an identification task controller 214 as well as a case decanting task controller 216 and a transportation task controller 218. The central controller is further coupled to a shuttle transport controller 220 that controls a speed of transport and a speed of ejection, and a packing task controller 222 that controls item-to-wall margins as well as item-to-item margins.

Figure 7A:
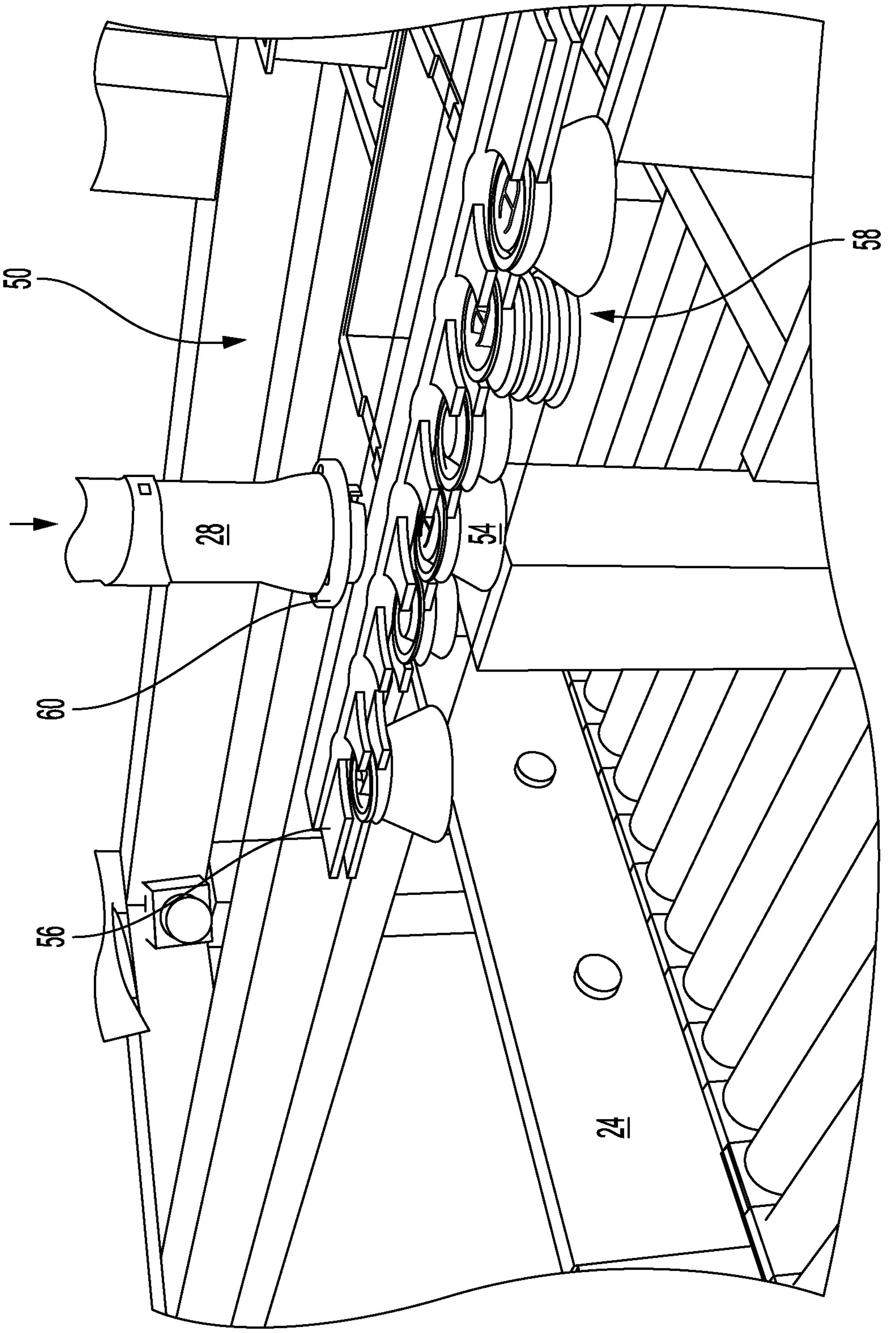
FIGS. 7A and 7B show illustrative diagrammatic views of an end-effector of the item processing station of FIG. 1 approaching a new vacuum cup (FIG. 7A) and having become attached to the new vacuum cup (FIG. 7B)
Figure 7B:
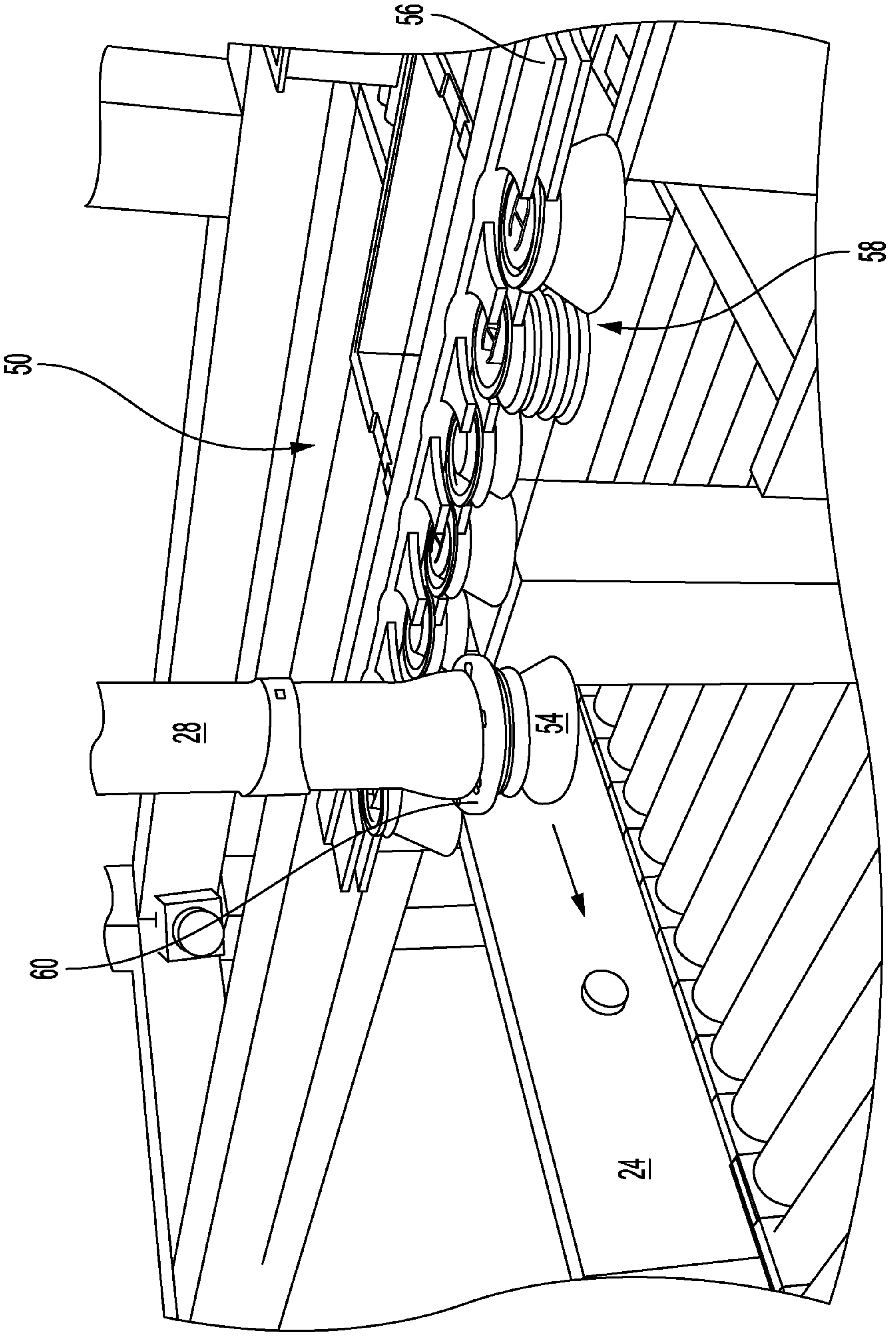

The system may change vacuum cups at a cup change station 50 as shown in FIGS. 7A and 7B. The cup change station 50 provides a variety of types of vacuum cups of different sizes as shown at 58 on a rack 56. One or more magnets 60 on the end-effector 28 engage a cup from a vertical direction (as shown in FIG. 7A) and may move away from the rack 56 with an engaged cup 54 in a horizontal direction (as shown in FIG. 7B). Placing a vacuum cup back onto the rack 56 involves moving the end-effector in the opposite directions (first horizontal and then vertically) to separate the cup from the one or more magnets 60 on the end-effector 28.

With regard to transport faults, detected faults may include 1) loss of item fault as detected by loss of vacuum detected by pressure sensors or failure of mass conservation check by scales, 2) jam or inability to move along axis as desired because item is prevented from being moved after or during transport, and 3) timeout waiting fault while waiting for a shuttle to be available to receive an item.

With regard to packing faults, detected fails may include 1) dropping an item as detected by loss of vacuum detected by pressure sensors or failure of mass conservation check by scales, 2) multi-pick- or picking more than one item when only one item is intended to be picked (by detecting a failure of mass conservation check by scales that detect that more than one item was lifted from the pick area, 3) a torque fault reported by the robotic system (e.g., due to a collision in the robotic environment as reported by the robotic system, 4) destination container overfull fault as detected by a container scanner that infers from depth imagery that item exceed or over-hang a maximum height, and 5) unable to pack fault because of expectation of container overfull after place as detected by a container scanner that infers from depth imagery that item exceed or over-hang a maximum height as predicted prior to placement.

With regard to identification faults, detected faults may include the inability to scan an item as detected by there being no successful scan of a barcode or recognition from geometric or visual features. With regard to decanting faults, detected faults may include case contents jammed faults as detected by an inability to disgorge contents of a case because, for example, the case is too tightly packed as detected by scanning the case contents or load sensing, as well as tote overfull faults as detected by scanning tote contents.

Some faults may impede the robot's operation in a way that a person must come to the robot cell and intervene, for example, to clear a dropped item, for instance. This yields an intervention request, where the system signifies visually and/or audibly, on a UI, or via an API, that it needs to be serviced. Other faults may not impede robot operation, but instead might attach via API with the WMS that a given container needs to be serviced. These kinds of faults, called exceptions, do not stop the robot cell because they defer the exception handling by encapsulating the exception in a tote or container that exits and travels away from the robot cell.

Figure 8A:
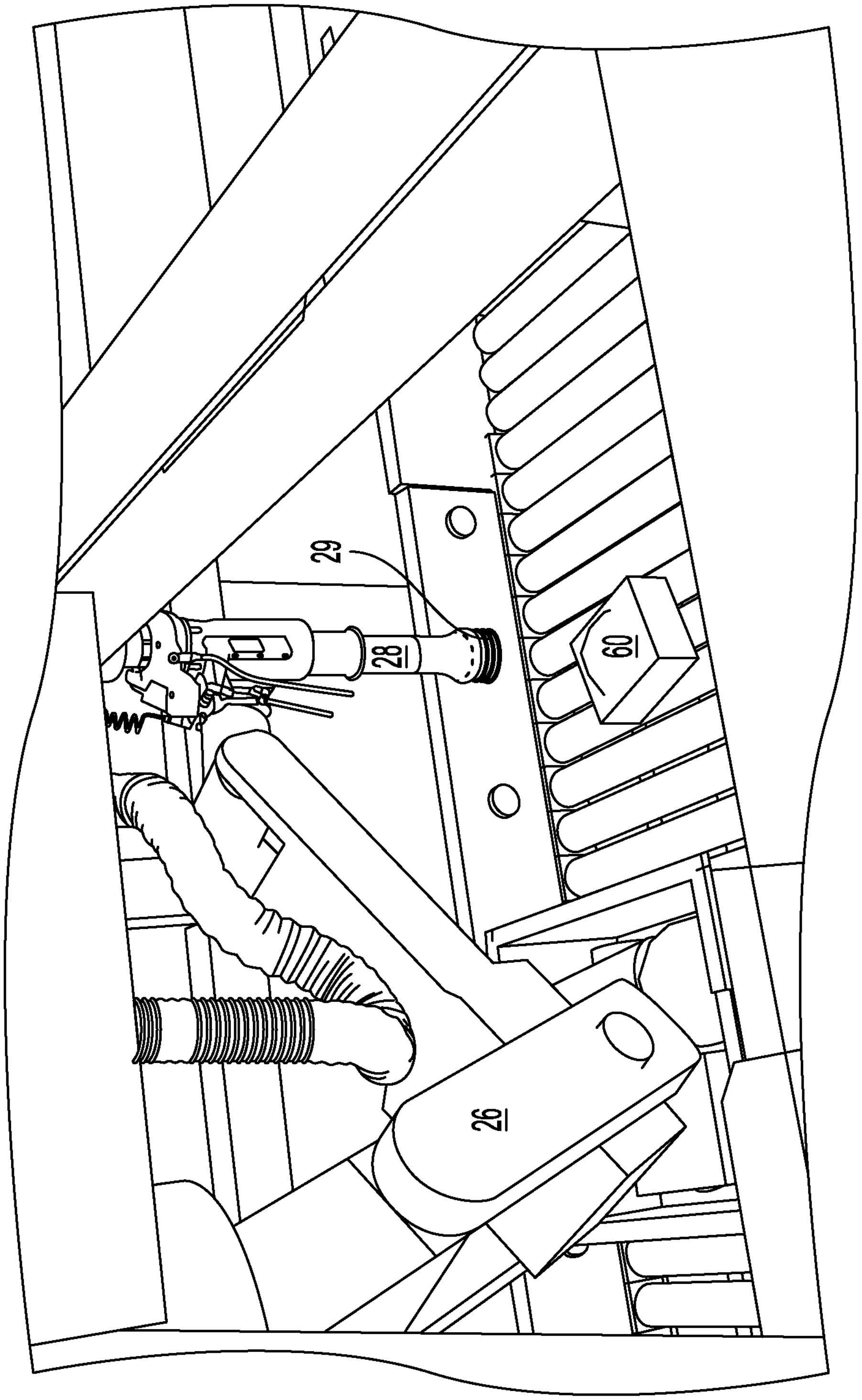
FIGS. 8A and 8B show illustrative diagrammatic views of an item having been dropped onto a conveyor (FIG. 8A) and of the end-effector being used to clear the item (FIG. 8B)
Figure 8B:
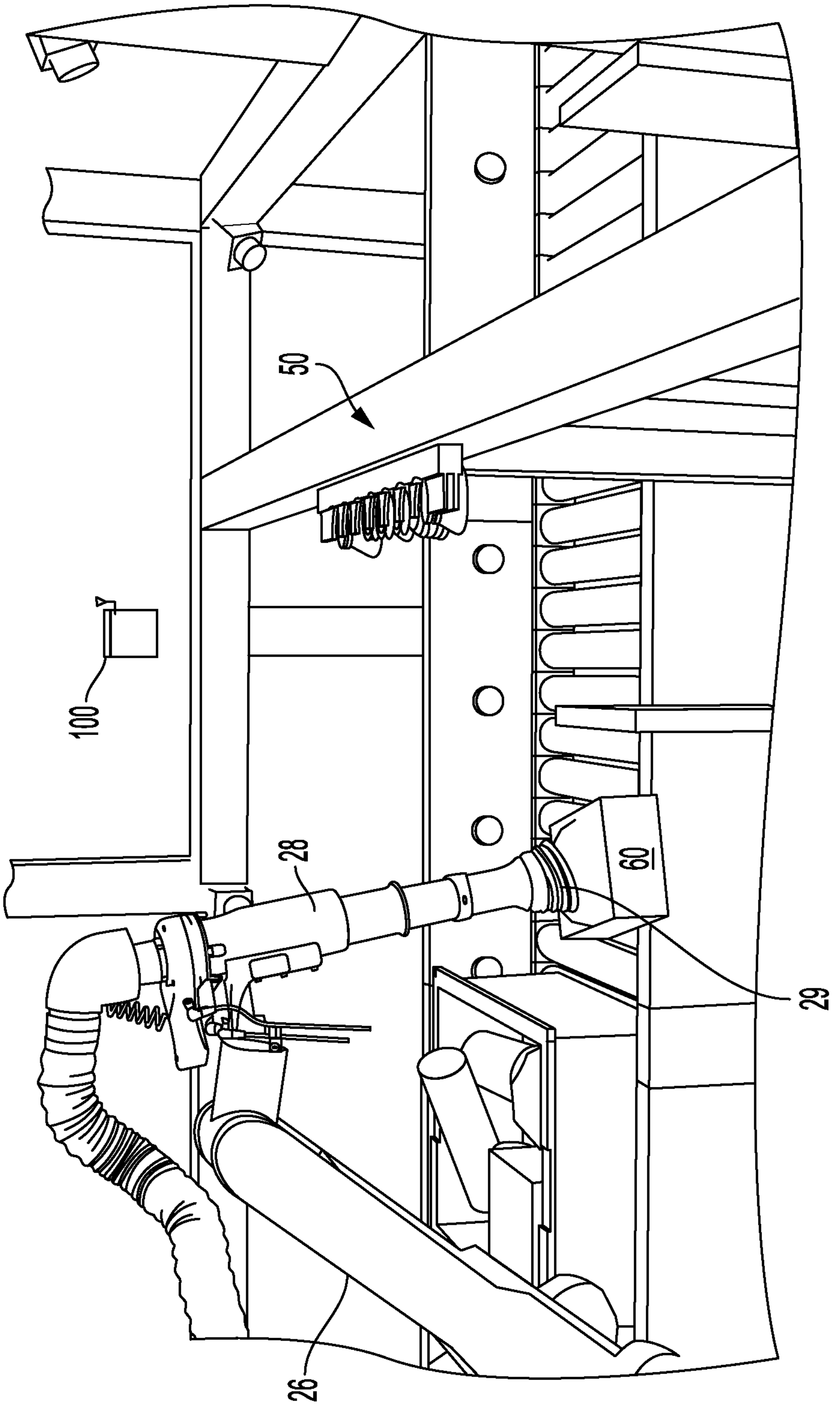

For example, in accordance with an aspect, items may fall into the removable catch floor 44 that may be removed from under the programmable motion device so that items therein may be collected and either reintroduced to the input system or processed manually. In accordance with other aspects, when the system determines that an item 60 has fallen onto the input conveyor 26 (as shown in FIG. 8A), the programmable motion device may be directed to grasp (or sufficiently grasp) the item so that it may bring the item over the floor catch basin to be dropped into the floor catch basin for processing as detailed above (as shown in FIG. 8B). If the item may not be so grasped for transfer to the floor catch basin, the system will visually and/or audibly signal that intervention by human personnel is required as discussed above.

FIG. 9 shows the removable catch floor 44 being removed with any items that had either been inadvertently dropped or intentionally ejected from the end-effector, and FIG. 10 shows the perception units 26 on opposing sides of the removable catch floor 44 for monitoring and/or confirming that each item expected to be received within the catch floor 44 is received within the catch floor 44.

During any one instance of a task, there are yet further latent or un-modeled environmental conditions that may contribute to faults such as how items might be arranged in a tote, or how items are packed in a case. It may be difficult to model or detect these latent conditions. Averaging over these un-modeled latent conditions, the propensity for any of these faults will be dependent on (i) the controlled parameters; and (ii) the handled item's properties. This can be described as a probability of fault as a function of the controlled parameters and modeled properties.

Finally, there may be events that occur in the cell that should be classified as faults, but go undetected. The system may be designed to minimize these false negatives by providing the system with an adequate suite of mechanisms to detect such events. For example, if a robot cell has not detected the event, there is no feedback loop and so these events cannot be automatically minimized over time. Also, the system may not be able to detect some kinds of damage to an item, in which case it will not be able to reduce that kind of damage over time.

Operating performance goals and probabilistic fault models may be employed to assess parameter sets and item combinations over time. Together the parameters and the physical properties of the handled item will determine the performance of the task on the one item. Some parameters and item combinations may yield poor performance or a high rate of some set of faults. Conversely, some parameters and item combinations may yield low faults and good performance.

A robot's operating performance at a given task is measured by a set of key performance indicators (KPIs) that measures average performance over all the tasks that the robot has executed. These are post hoc measures averaged over some window of time or number of tasks executed. Examples of KPIs are: Throughput: number of completed tasks per hour, Intervention rate: number of interventions per hour, Exception rate: number of exceptions per hour and other combinations or measures of relevant fault rates.

These indicators are metrics by which service may be measured in a customer/provider relationship in order to achieve an operating performance goal. A service level agreement (SLA) is a contractual agreement on the operating performance usually expressed as min/max targets on KPIs. Not hitting targets and thus not hitting an SLA may incur penalties to the robot cell vendor; conversely, exceeding targets could be rewarded. Some elements of these KPIs may not depend on parameters or items but may be due to other uncontrolled/unmodeled factors. The function K(T) may generally be written to represent a relevant metric of past transfers encoded in a sequence of task results T. Such metrics are assumed to have finite memory, windowed by time or number of task results.

Note that there can be tradeoffs between elements of performance: a slow transfer may induce fewer drops but reduce overall throughput; fast transfers may lift throughput but increase drops. The system might express a metric as a combination of others so as to balance two or more metrics: $K_1(T)=a\ K_2(T)+b\ K_3(T)$. The system might also specify constraints such as $K_4(T)<\kappa$ to hit an SLA for a given KPI. An objective of systems of the invention is to learn the parameters for each item that enable the robot to hit its SLA, which can be expressed by the designer as some combination of goals (e.g., highest $K_1(T)$) under optional constraints (e.g., $K_2(T)$ not to exceed $K_2$). The system solves these problems by optimizing surrogates for the KPIs.

One set of surrogates may be based on probabilistic fault models (PFM). For any fault type f there is the possibility of a fault event occurring on a given task and item i and parameter $x \in X$, where again X is the parameter space. Consider the relation $b_{f,i,x}=1$, meaning the fault event in question occurred, or $b_{f,i,x}=0$, meaning the fault event did not occur. The probability fault model for fault type f is:

$$P(b_{f,i,x})=B(p_{f,i}(x))$$

where B(•) denotes a Bernoulli distribution which takes values 0 or 1. That is, $P(b_{f,i,x})$ is a discrete Bernoulli distribution with a probability fault model function $p_{f,i}(x)$ indexed by fault type f and item i, and function of the parameter x. For any task and fault type, this PFM exists but will be unknown. The system can only construct estimates of it from past performance. The estimate is used to predict performance of the next execution of the task on that item. In particular, the probabilistic model can be used to predict the change to the KPI as a function of parameter choice.

The KPIs measure operational performance and by design have a finite memory. They measure how the system is performing in the last hour or day, and will vary based on the distribution of items encountered. The system uses the probabilistic fault model to choose the best parameters on the basis of its predictions. The PFM should be the best estimate of the true PFM and will use as much data as is practical.

Figure 11:
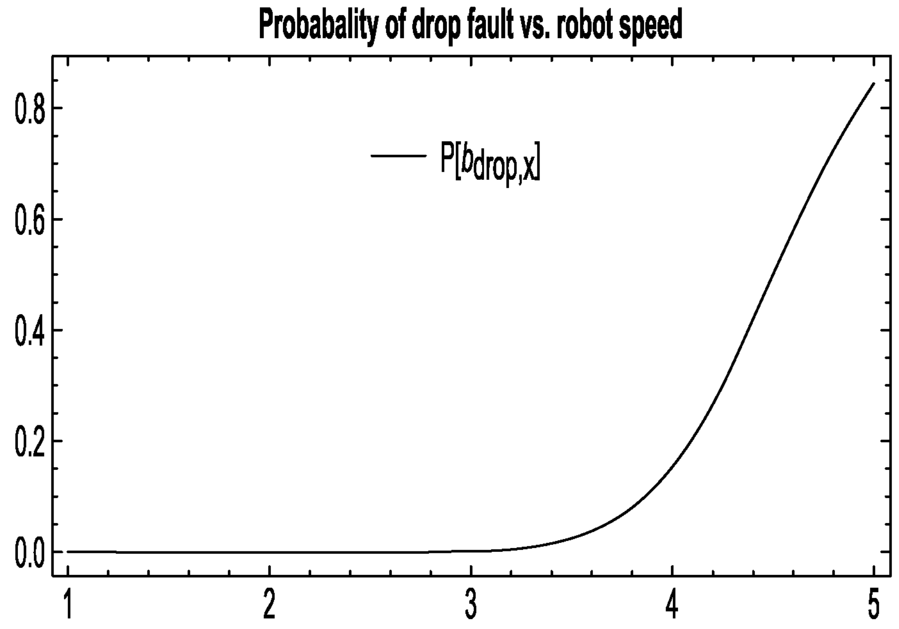
FIG. 11 shows an illustrative graphical representation of a probabilistic fault model of drops verses robot speed for use in accordance with an aspect of the present invention.
Figure 12:
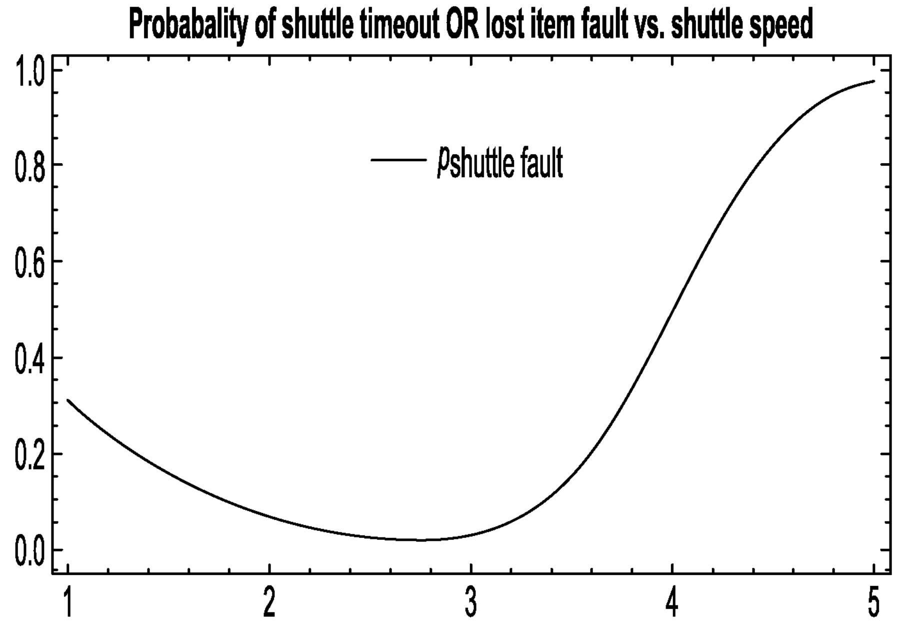
FIG. 12 shows an illustrative graphical representation of a fault model of shuttle time-out verses shuttle speed for use in accordance with an aspect of the present invention.
Figure 13:
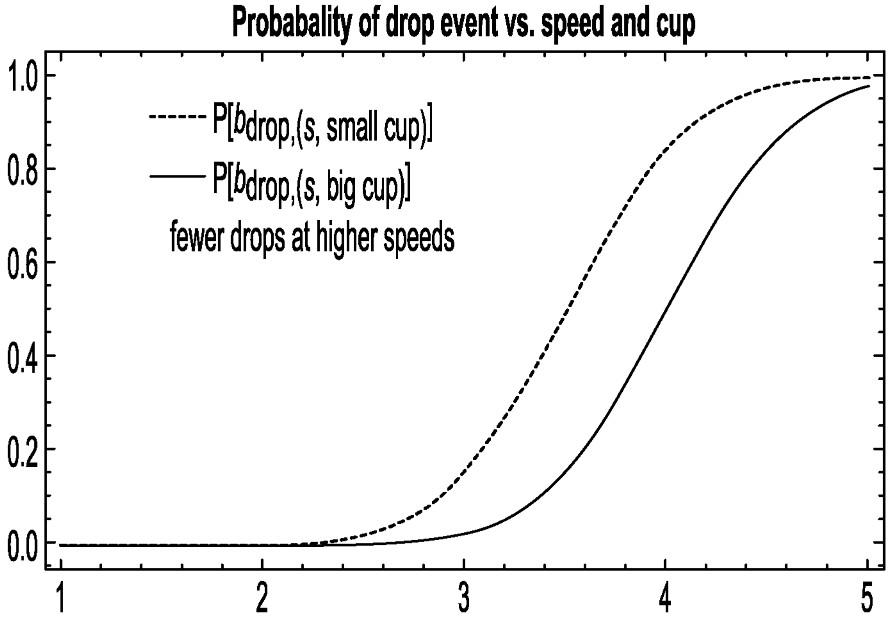
FIG. 13 shows an illustrative graphical representation of a fault model of drops verses robot transfer speed and vacuum cup sizes for use in accordance with an aspect of the present invention.
Figure 14:
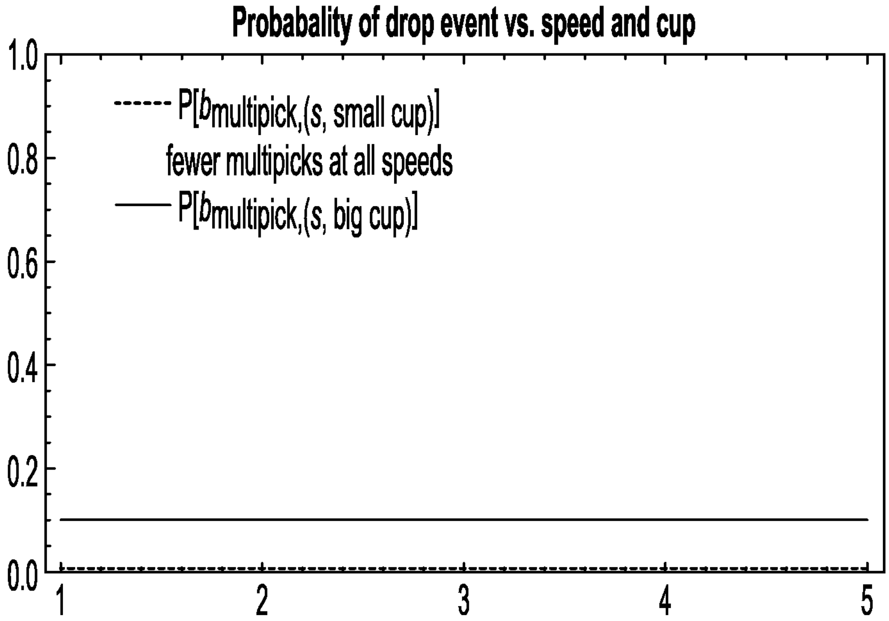
FIG. 14 shows an illustrative graphical representation of a fault model of multi-picks verses robot speed and vacuum cup sizes for use in accordance with an aspect of the present invention.

FIG. 11 shows a probabilistic fault model for drops vs. robot transfer speed for a fixed SKU. Speeds above 3 units (e.g., feet/sec.) start to incur increasingly higher drop rates. FIG. 12 shows a probabilistic fault model for shuttle timeout or lost item on a shuttle vs. shuttle speed. Running too slow times out too often, and running too fast causes too many lost items. FIG. 13 shows a probabilistic fault model for drops vs. robot transfer speed and vacuum cup size for a SKU. Larger vacuum cups have greater stability and can hold items at higher speeds. FIG. 14 shows a probabilistic fault model for multi-picks vs. robot speed and vacuum cup size for an SKU. Multi-picks, or when the vacuum cup picks more than one item, only depend on the vacuum cup and not the transfer speed. Larger vacuum cups however, are more likely to result in multipack than small vacuum cups.

Figure 15:
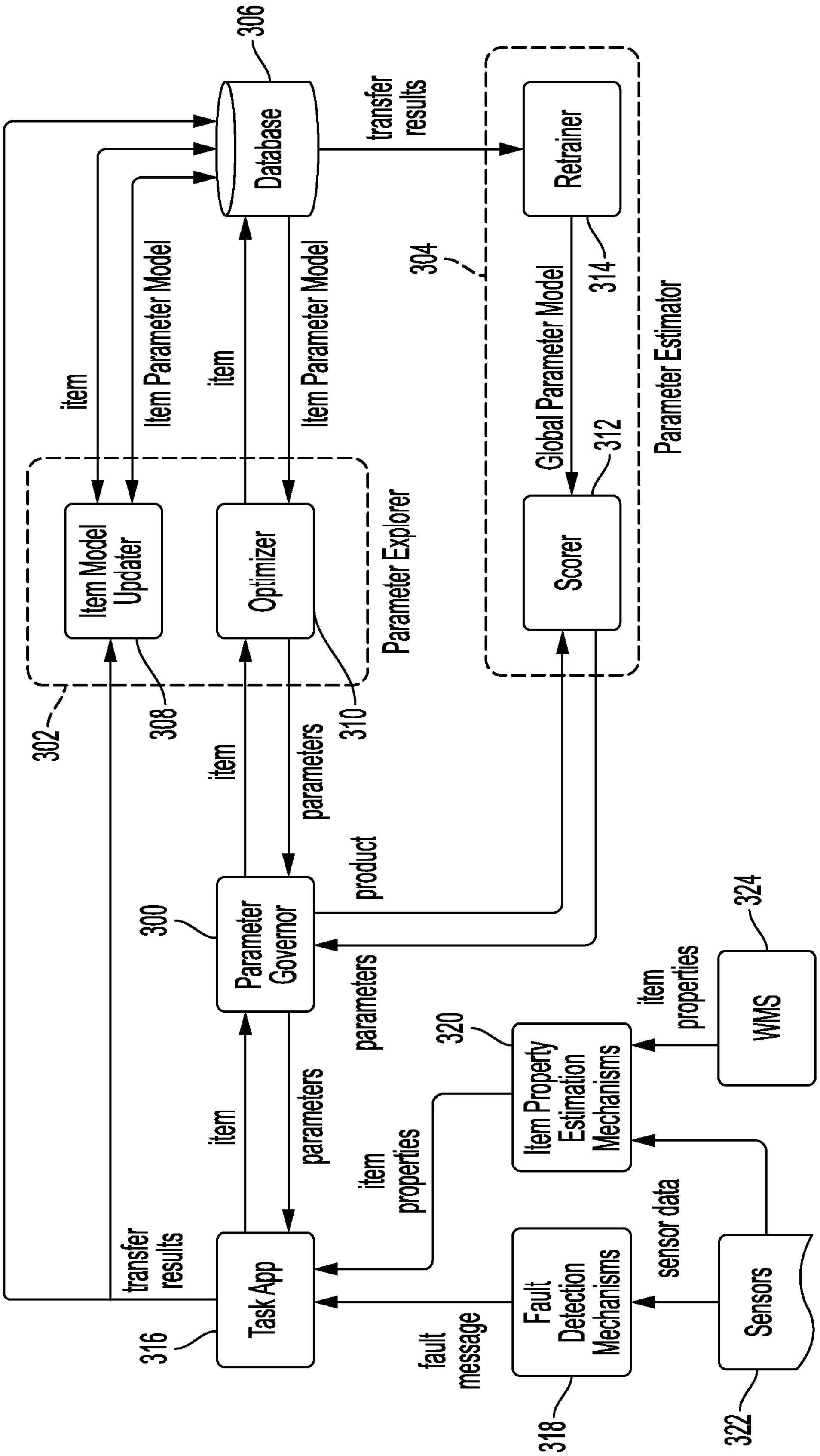
FIG. 15 shows an illustrative diagrammatic view of the system architecture for an item processing system in accordance with an aspect of the present invention.

With reference to FIG. 15, the architecture for the system includes a Parameter Governor 300 in communication with the Parameter Exploration module 302 and the Parameter Estimator 304. FIG. 15 summarizes the architecture of the Parameter Explorer, the Parameter Estimator and the Parameter Generator. The Parameter Exploration module 302 includes a model update module 308 in communication with a singulation app 316, as well as an optimizer 310. The Parameter Estimator 304 includes a scoring module 312 in communication with the Parameter Governor 300, as well as a re-trainer 314 in communication with a database 306.

The machine learning is preferably based on a sequential hypothesis testing methodology of a variable sample size and a more manageable parameter space (as opposed to iterative or gradient descent optimization methods).

The Task Application (Task App) executes the material handling tasks and serves the supervisory role of coordinating many sub-systems like motion planners, perception systems, device drivers, etc., all in order to execute the task at hand. It implements the detection mechanisms for faults; interfaces with the WMS; and otherwise controls the robot to repeatedly accomplish the task. At the end of each transfer attempt, the Task App stores in a database the results (success or failure and any other relevant data) of the executed task.

The Task App interfaces with mechanisms that help it detect faults, labeled in the diagram Fault Detection Mechanisms, as well devices and software to estimate properties of the Item Property Estimation Mechanisms. Each may represent a variety of mechanisms that variously provide the corresponding detection or estimation functions. The Parameter Governor serves as an interface between the Parameter Estimator, the Parameter Explorer and the Task App. The Parameter Governor receives product data, such as SKU properties, from the Task App and makes the decision as to whether the item will be handled using parameters from the Parameter Explorer or from the Parameter Estimator. The Parameter Governor may make the decision not to handle the item, effectively deeming the item incompatible or ineligible for automation.

The Parameter Explorer includes two parts: Item Model Updater and Optimizer. The Item Model Updater is called by the Task App at the end of each transfer attempt. The Item Model Updater receives that last transfer result, retrieves an Item Parameter Model (IPM) from the database corresponding to the given item, and updates the model with the results of the last transfer and stores it back in the database. The Optimizer receives product data from the Parameter Governor, retrieves from the database product's exploration model, chooses the next parameters and sends them back to the Parameter Governor. If a product is picked for the first time then the database does not have its model and the Optimizer will return empty parameters.

The Parameter Estimator consists of three parts, software modules Scorer and Retrainer and a data product that is the Global Parameter Model (GPM). The Scorer receives from the Parameter Governor the product data, runs the product through the GPM and returns parameters selected by the model. The Scorer is decoupled from the GPM since the GPM is a version-controlled entity that changes over time. The Retrainer retrieves new transfer results from the last training, combines them with old transfer results, and retrains the model, producing a new GPM. The Retrainer runs periodically, e.g., once a day.

The Retrainer may be local or remote from the system. The above architecture may be run in isolation, controlling one robot performing a task in one warehouse. In some circumstances, the Retrainer may operate externally to the warehouse, and may collect and combine the transfer results from one or more warehouses and robot cells performing the same handling tasks. The Retrainer exports a Global Parameter Model that may be subjected to quality assurance or regression tests, and then uploads a new Global Parameter Model to the robot cells' local databases.

The Parameter Exploration learns item properties and good item parameters. During exploration, two things are being learned: (1) the item's properties; and (2) good parameters for the item. Information about (1) may not be provided or may be degraded in quality or accuracy. If the Global Parameter Model predicts the same parameters that have been learned through exploration, it is because the item's properties that were learned through exploration were able to predict the same good parameters. It may be that there is a mismatch, which may indicate poor predictive capability in the Global Parameter Model to predict good parameters for the given item. There are a couple of reasons for mismatches between the Parameter Exploration found parameters and parameters from the Global Parameter Model (GPM).

The GPM may be immature in the sense that there is little training data or support in the region of the learned properties of the item. For example, when all prior task results have been on <500 g items, one would expect poor predictions on 1 kg items. Another possibility is that multiple parameters may be equally good. For example, the PFM may be flat for a range of parameters. In this instance, there is a change of parameters that don't matter. Many parameters could be equally good. So, training the GPM may have yielded one good parameter, whereas small perturbations in properties or task results may yield another good parameter when the IPM is trained.

Finally, a third possibility is that there are latent or hidden item properties that are not supplied by the WMS and cannot be estimated from sensor data, but would induce different good parameters had those properties been provided. In machine learning terms, the regression learning is inseparable given the available features, but would be separable if some additional features were made available. For example, two items might have the same weight and dimensions, but one item might be apparel in a plastic bag, and the other item might be electronics in a box. If the inputs to the GPM are only weight and dimension, then the GPM will output the same parameter for each item. However, the bagged item might require slower motions to achieve the same fault rate as the boxed item, for example.

In any case, the GPM may provide parameters that are non-performant on an item, either because of lack of support or inseparability. If the IPM were to continue to be updated for an item through exploration, then it would learn the better parameters and there would be IPM/GPM divergence. If the divergence is due to lack of support, then the GPM should be updated with the new training data. If the divergence is due to inseparability, however, then the system should continue to use the IPM because the GPM will never have access to the features that differentiate the item.

The Characteristics of Global and Item Property Models may also vary. Both the Parameter Estimator and the Parameter Explorer generate parameters based on predictions from a machine learning model, the Global Parameter Model and the Item Parameter Model respectively. The GPM is a model that takes as input an item's properties, and outputs a prediction of a good parameter for the item. The GPM cannot be used to drive the exploration process. Using the GPM model requires that item properties are known, but many warehouses do not maintain a database of item properties. If item properties are known and the system obtained a first pick and an item property estimate, if the transfer results in a fault, then the parameter may be bad. A response may be to retrain the model using this information. There are two problems with this: (1) it may be computationally expensive to retrain the model with all prior transfer results and this new piece of information; and (2) there may be a lot of inertia or training support around the given input parameters and the given good parameter may be valid for a large number of other items. It may take a lot of failed transfers for the GPM to generate a new parameter for the new item.

As discussed above, the quality of parameters generated by a model depends largely on the training set. For example, if the training set has only product transfers at the slow speed, then the model will also select slow speed for transferring future products. When exploring new items, the Parameter Explorer may not make assumptions about what good parameters are for new items. It is learning both item properties and good parameters. It therefore employs an IPM model for each item, which is isolated from the GPM.

The following table summarizes their differences between the GPM and IPMs:

| | Global Parameter Model (GPM) | Item Parameter Model (IPM) |
|---|---|---|
| to which items applicable | one model for all items | one model per item |
| transfers that are used to train a model | transfers from all items | transfers from one item |
| frequency of update of machine learning model | periodically (e.g., every day) | after every transfer of the item |
| inputs to one model | item properties | none |
| outputs from one model | best parameter for a given item | best parameter |
| cost of retraining | expensive - takes many hours | cheap - simple model for a single item can be updated every transfer |

With this design, if an item has unknown properties then the system is able to predict and learn parameters while making the least assumptions about the item.

The system may therefore provide robust estimation of item properties. With reference to FIG. 15, the Item Property Estimation Mechanisms may involve several layers (though shown as a block) including sensor drivers, potentially independent software modules for inference, and potentially multiple layers of processing, inference and integration in the Task App.

Two item properties are highly predictive of performance in handling tasks: weights and dimensions. The system measures weights with scales that are able to verify how many items have been picked when the item's mass is known. When the item's mass is not known, the system is unable to discern from one measurement whether the system has grasped 1 item or more than 1 item. It can therefore not infer from just one pick the item weight. However, over the course of multiple picks, it can infer from the history of weights by discretizing the weights to buckets larger than the noise level and using the smallest mode as a weight estimate. Dimensions may be measured by 3D scanners while the item is being grasped, or after the item is put down.

Figure 16:
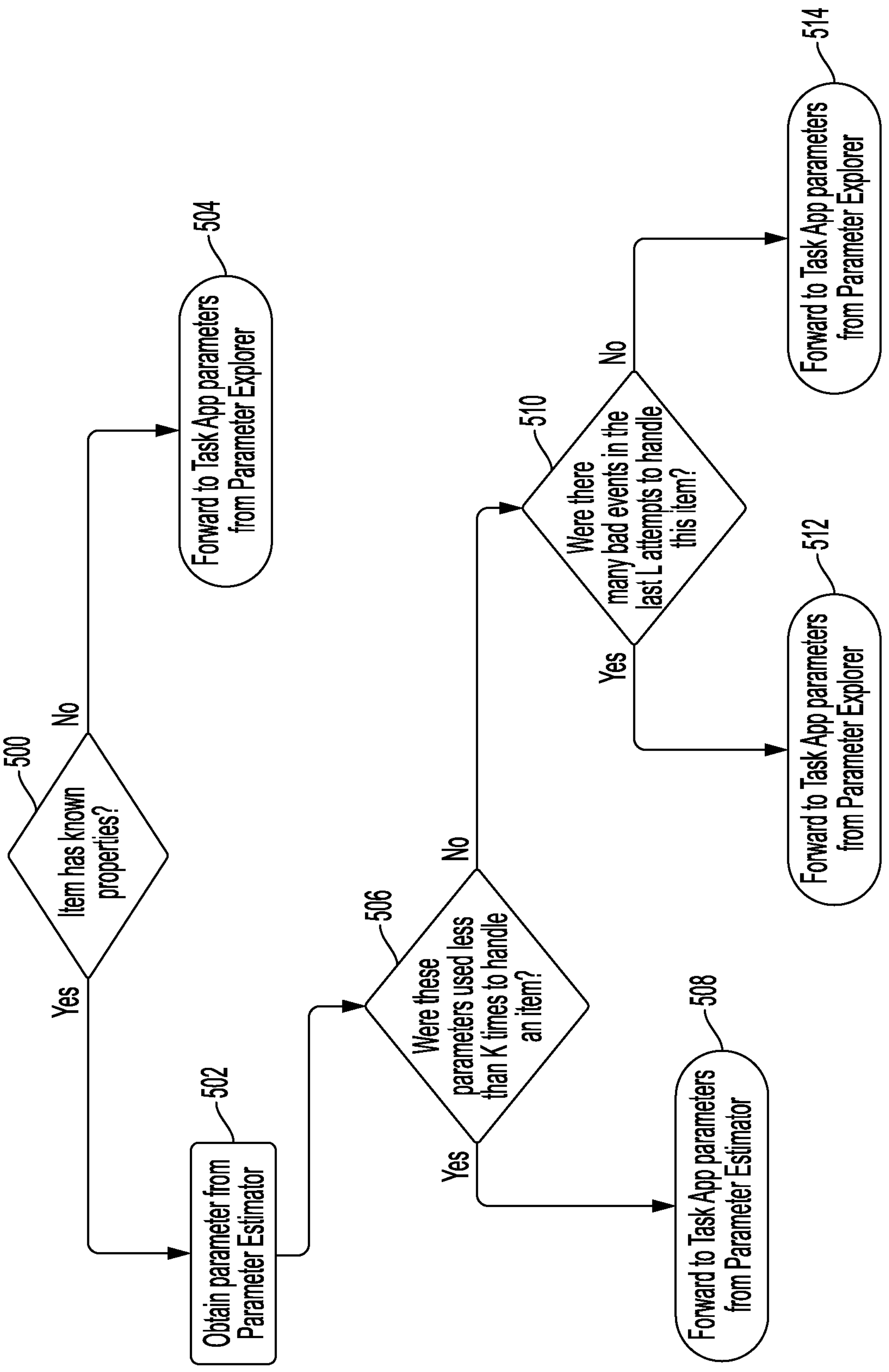
FIG. 16 shows an illustrative diagrammatic flow diagram of a logic flow of a parameter governor in a system in accordance with an aspect of the present invention.
Figure 17A:
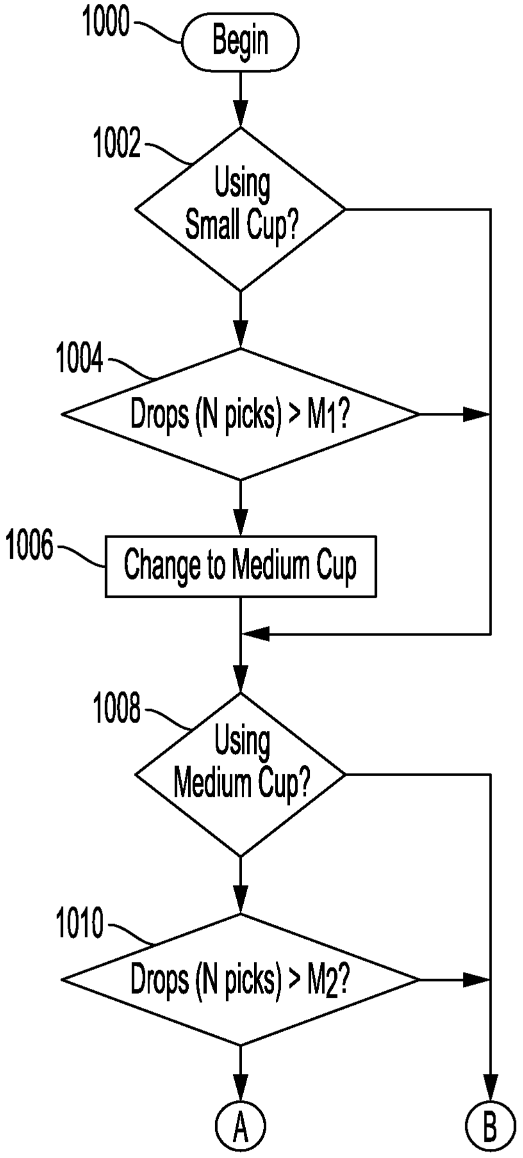
FIGS. 17A-17D show illustrative diagrammatic flow diagrams of an optimizer program for use in an item processing system in accordance with an aspect of the present invention.
Figure 17B:
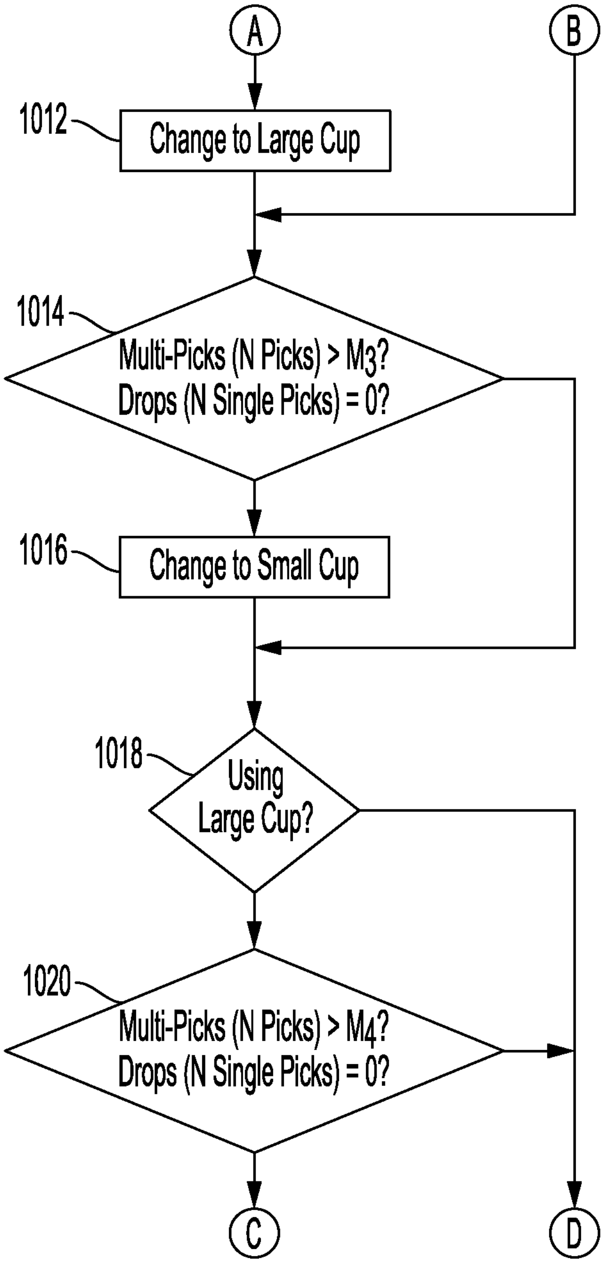
Figure 17C:
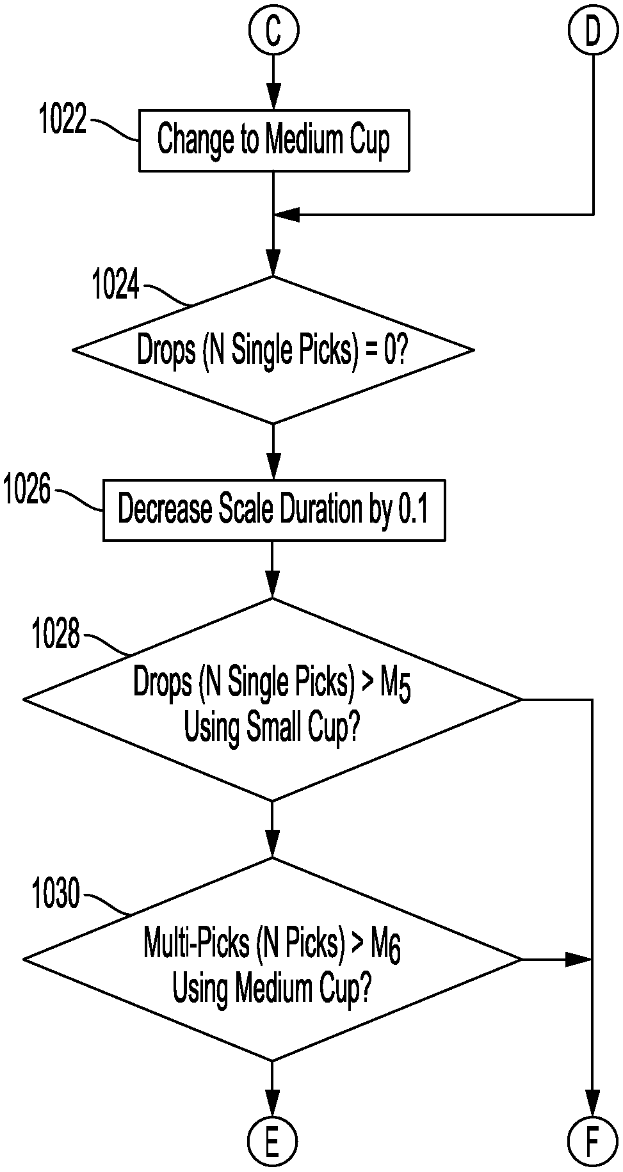
Figure 17D:
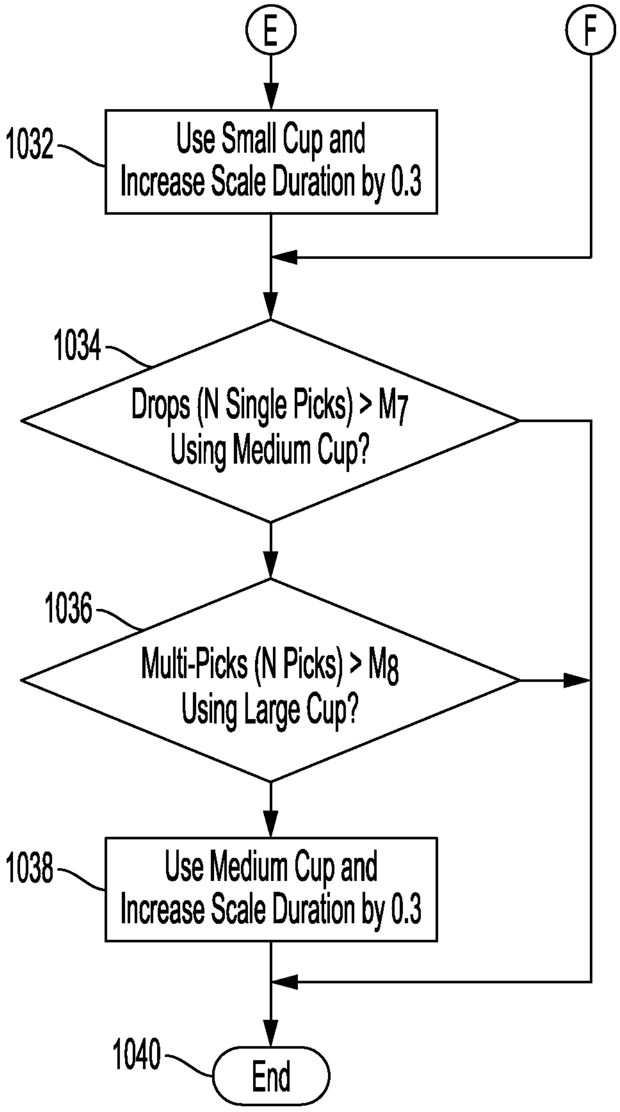

The Parameter Governor Design is a broker that decides whether the Task App. will handle an item using parameters from the Parameter Estimator or from the Parameter Explorer. The Parameter Estimator is employed, for example, when there is enough information about the item to use a global model, similar to a regression. In an example, weight(s) and dimension(s) may be input and the system outputs parameters such as vacuum, cup size and speed. The Parameter Explorer is employed, for example, when there is not yet adequate information about the characteristics of the item to employ regression. For example, there are no weights or dimensions to input. The Parameter Explorer may also be employed where it has become clear that the performance of the parameters output from the regression result in inadequate performance, and therefore, other parameters have to be sought through exploration. The flowchart in FIG. 16 shows the logic flow of the Parameter Governor. FIG. 16 shows that the system first determines whether an item has known properties (step 500), and if so, the system obtains parameter(s) from the Parameter Estimator (step 502), and if not, the system forwards the Task App parameters from Parameter Explorer (step 504). After the system obtains parameters from the Parameter Estimator (step 502), the system determines whether the parameters were used less than K times to handle an item (step 506). If so, the system forwards to the Task App the parameters from the Parameter Estimator (step 508). If not, the system determines whether there were many bad events in the last L attempts to handle the item (step 510). If so, the system forwards to the Task App parameters from the Parameter Explorer (step 512). If not, the system forwards to the Task App parameters from the Parameter Explorer (step 514).

The system therefore provides that the GPM requires item properties as inputs, so if the item properties are unknown, the system cannot use the GPM, so instead the system must use exploration. If the item's properties are known, exploit the large history of experience and knowledge built into the GPM, so the system should use the GPM to generate parameters. If item properties have been estimated, but the performance from the GPM has been found through experience to be poor, then the system should use exploration. If the poor performance is due to lack of support, then the Retrainer will start to gather data and support in this regime, and over time the GPM parameter proposal will converge to the IPM proposal over time. If the poor performance is due to inseparability, then GPM and IPM outputs will always be divergent, and the IPM will continue to be chosen.

The Parameter Explorer Design involves multiple operational policies. There are several different ways to implement the Parameter Explorer, including the Optimizer and Item Model Updater. The system includes two approaches that have been tried in the context of a picking task. The measured faults sought to be reduced are drops and multi-picks, which depend on the choice of suction cup on a gripper, the speed of the robot arm, and optionally the vacuum pressure. Briefly, the approach that is described in detail in the following is Fixed Heuristic-Based Policy: A manually created set of rules for setting values of parameters. For example, if SKU weight is less than 0.2 kg then use a small cup, otherwise use a medium cup. Such a set of rules can be created using domain expertise. An ML-based approach with periodically retrained model has two advantages over the manually created set of rules: (1) it can find new correlations between item characteristics and results of transfers, that are not captured by the rules, and (2) it can customize parameters for packaging types, product categories and brands that are not known in advance and will appear at warehouse in the future.

In the picking task the system may encounter many different items (aka SKUs). As described previously, there will be a different Item Parameter Model for each item. While picking, the robot may encounter items in an interspersed manner (not all at once). So implicit in the descriptions that follow is the understanding that the Parameter Explorer may operate on the one instance of some item A, and then the Task App may be switching to another mode (estimation, e.g.) for the next item B it encounters. Once it re-encounters A, it may switch back to exploration for the item, depending on the decisions of the Parameter Governor.

The approach provides a Fixed Heuristic-Based Policy involving an optimizer program with a heuristic policy implemented as a set of if-then rules. For example, and with reference to FIGS. 17A-17D, the program begins (step 1000), if a product is currently picked with a small cup (step 1002) and there were more than $M_1$ drops in the last N single-picks (step 1004), then the next pick will be with a medium cup (step 1006). If a product is currently picked with a medium cup (step 1008) and there were more than $M_2$ drops in the last N single-picks (step 1010), then the next pick will be with a large cup (step 1012). If a product is currently picked with a medium cup (step 1008) and there were more than $M_3$ multi-picks in the last N picks and in these N picks there were no single-picks with drops (step 1014), then the next pick will be with a small cup (step 1016). If a product is currently picked with a large cup (step 1018) and there were more than $M_4$ multi-picks in the last N picks and in these N picks there were no single-picks with drops (step 1020), then the next pick will be with a medium cup (step 1022). If there were no drops in the last N single-picks (step 1024) then decrease scale duration for the product by 0.1 (step 1026). If there are more than $M_5$ drops within the last N single-picks using a small cup (step 1028) and more than $M_6$ multi-picks in the last N picks with the medium cup (step 1030), then use a small cup and increase scale duration by 0.3 (step 1032). If there are more than My drops within the last N single-picks with medium cup (step 1034) and more than $M_8$ multi-picks in the last N picks with the large cup (step 1036), then use medium cup and increase scale duration by 0.3 (step 1038). The routine may end (step 1040) or repeat.

The above set of if-then rules represents a policy implemented in the Optimizer. The corresponding Item Parameter Model encodes (i) the statistics of past transfers vs. parameter choice; and (ii) the current state or parameter choice. The Item Model Updater updates the given parameter choice output from the above Optimizer, and updates the statistics as a result of the transfer.

Note that each step above can be shortened to an accept-reject test, so that not all N picks need be evaluated. If N=20, for instance but in the first 3 picks two drops have already occurred for a fixed parameter choice, then we can immediately reject that parameter choice. This speeds up the exploration process by reducing the number of transfers evaluated before changing to the next candidate.

The fixed policy as described above has a number of limitations: (1) they depend on the constants M and N, it might be hard to find their optimal values, (2) they have fixed thresholds for switching between parameters and do not support the logic of switching back and forth between different parameters. For example, suppose that M=2, N=20 and there were 3 drops in the last 20 picks with a small cup, then 3 drops in 3 picks with both medium and large cups. If-else rules do not specify what cup to choose. Hence this case the robot will need to use a heuristic for choosing the next cup, and this heuristic might fail, and (3) when generalizing to many different faults, a large number of hand-determined rules will be needed to cover different combinations of bad events and required changes of parameters. The last point motivates a more general approach described below that does not require hand-tuning a policy.

In accordance with an aspect of the present invention, a Bayesian optimization-based exploration process may be employed. Bayesian optimization is a machine learning approach for optimizing an unknown function. In this approach, the parameters are chosen by mathematical model and not by hand-tuned heuristics, allowing us to overcome the limitations of parameter exploration using if-then rules.

Bayesian optimization recursively updates an estimate of the function(s) being optimized. Here the functions are PFMs given the item, $p_{f,i}(x)$, which were defined previously. This and other recursive estimation algorithms like the Kalman filter balance past information with new information. The running state in these approaches include a mean and (co-)variance. Low variance in the running state implies confidence and combats high measurement noise. Conversely, high variance in the running state implies low confidence, and informs the algorithm to heavily weigh new evidence. Gaussian Processes serve the function of mean and covariance when that which is being estimated is a continuous function and where observations are made at only parts of the function.

An n-dimensional Gaussian variable $x \sim N(m, C)$ has a probability distribution with mean m and covariance matrix C. It describes a Gaussian-shaped probability lump in multidimensional space centered around the mean, and shaped according to the covariance matrix.

A Gaussian Process generalizes the idea of a multivariate Gaussian distribution to an infinite dimensional space: instead of defining a distribution over a finite-dimensional vector $x_i$ with $i \in \{1, \ldots, n\}$, it defines a distribution over an infinite-dimensional function $f(x)$ where x is in some domain X like the real numbers $\mathfrak{R}$. If $f$ has a GP distribution, we write $f \sim GP(m, k)$, where m is the mean function and k is the covariance kernel. The expected value of $f(x)$ is m(x) and the covariance kernel is the expected product of the deviation from the means:

$$m(x,x')=E[f(x)] \text{ and } k(x,x')=E[(f(x)-m(x))(f(x')-m(x'))].$$

For any finite subset of real numbers $x_1, \ldots, x_n$, the vector $[f(x_1), f(x_2), \ldots, f(x_n)]$ is a multivariate Gaussian distribution.

In practice, the major difference between the multivariate Gaussian and GP is the starting or prior covariance. For contrast, in a Kalman Filter (with multivariate Gaussians) the prior covariance is typically a diagonal matrix: at start, $x_i$ is independent of $x_j$. In GPs, on the other hand, the whole point is to use non-zero off-diagonal covariance terms because of an a priori belief in the continuity of $f$. If $f$ is continuous, then the covariance of $f(x)$ and $f(x+\varepsilon)$ should converge to the variance of $f(x)$ as ε goes to zero: $\lim_{\varepsilon \to 0} k(x, x+\varepsilon)=k(x, x)$, and the correlation is 1 in small neighborhoods of x.

This makes inference practical when only part of the function can be observed because an observation of $f$ is typically only at one sample point x at a time. When doing inference, the prior's belief in continuity and therefore covariance between $f(x)$ and $f(x+\varepsilon)$ means that $f(x)-f(x+\varepsilon)$ should be small, and so the post-measurement difference of means $m(x)-m(x+\varepsilon)$ should be small too. Alternatively, if the off-diagonals of covariance were zero, then an observation of $f(x)$ would impart no information about $f(x+\varepsilon)$, and it would take too long to learn $f$.

Fundamentally, the covariance prior is used to enforce continuity in the sampled functions, which reduces the number of observations needed to get good estimates of the real underlying function.

Those skilled in the art will appreciate that numerous modifications and variations may be made to the above disclosed embodiments without departing from the spirit and scope of the present invention.

What is claimed is:

1. A control system for an item processing system with a programmable motion device, said control system comprising:

a parameter estimator for estimating adjustable item handling parameters of items for which item properties are known;

a parameter explorer for identifying through exploration adjustable item handling parameters of items for which no item properties are known; and a parameter governor for determining whether to employ the adjustable item handling parameters from the parameter estimator or the parameter explorer to configure the programmable motion device to handle an item, wherein the parameter governor determines to employ the adjustable item handling parameters from the parameter explorer responsive to at least one of a lack of history of handling with the item or a lack of information about item properties that affect handling of the item, and wherein the parameter estimator, the parameter explorer, and the parameter governor are executed on a processing unit.

2. The control system as claimed in claim 1, wherein the adjustable item handling parameters include any of robot speed, choice of vacuum cup, vacuum pressure and vacuum flow.

3. The control system as claimed in claim 1, wherein the adjustable item handling parameters affect perception processes that generate grasp candidate locations.

4. The control system as claimed in claim 1, wherein the adjustable item handling parameters include threshold values that affect behavior during transport of an item.

5. The control system as claimed in claim 1, wherein the adjustable item handling parameters include a speed of movement of a shuttle carriage.

6. The control system as claimed in claim 1, wherein the adjustable item handling parameters include margins used in packing.

7. The control system as claimed in claim 1, wherein the adjustable item handling parameters include pose orientation.

8. The control system as claimed in claim 1, wherein the adjustable item handling parameters include case decanting parameters.

9. The control system as claimed in claim 1, wherein the adjustable item handling parameters are chosen by the parameter estimator or the parameter explorer using optimization-based modeling involving sequential hypothesis testing.

10. The control system as claimed in claim 9, wherein the adjustable item handling parameters are chosen by Bayesian optimization that recursively estimates a function being optimized.

11. An item processing system comprising:

a programmable motion device, and a control system including a parameter estimator, a parameter explorer, and a parameter governor for determining adjustable item handling parameters to configure the programmable motion device to handle an item, wherein the parameter estimator is configured to estimate the adjustable item handling parameters for items for which item properties are known, and wherein the parameter explorer is configured to identify through exploration the adjustable item handling parameters, wherein the parameter governor provides the adjustable item handling parameters from the parameter explorer when the adjustable item handling parameters from the parameter estimator were unsuccessfully used in a predetermined number of past attempts to handle the item, and wherein the parameter estimator, the parameter explorer, and the parameter governor are executed on a processing unit.

12. The item processing system as claimed in claim 11, wherein the item processing system include a plurality of perception systems for monitoring faults during item processing.

13. The item processing system as claimed in claim 12, wherein the faults include any of picking task faults, transport faults, packing faults, identification faults, and case decanting faults.

14. The item processing system as claimed in claim 11, wherein the adjustable item handling parameters include any of robot speed, choice of vacuum cup, vacuum pressure and vacuum flow.

15. The item processing system as claimed in claim 11, wherein the adjustable item handling parameters affect perception processes that generate grasp candidate locations.

16. The item processing system as claimed in claim 11, wherein the adjustable item handling parameters include threshold values that affect behavior during transport of an item.

17. The item processing system as claimed in claim 11, wherein the adjustable item handling parameters include a speed of movement of a shuttle carriage.

18. The item processing system as claimed in claim 11, wherein the adjustable item handling parameters include margins used in packing.

19. The item processing system as claimed in claim 11, wherein the adjustable item handling parameters include pose orientation.

20. The item processing system as claimed in claim 11, wherein the adjustable item handling parameters include case decanting parameters.

21. The item processing system as claimed in claim 11, wherein the adjustable item handling parameters are chosen by the parameter estimator or the parameter explorer using optimization-based modeling involving sequential hypothesis testing.

22. The item processing system as claimed in claim 21, wherein the adjustable parameters are chosen by Bayesian optimization that recursively estimates a function being optimized.

23. A method of processing items with a programmable motion device, said method comprising:

providing a parameter estimator for estimating item handling parameters of items for which item properties are known;

providing a parameter explorer for identifying item handling parameters of items for which no item properties are known; and employing a parameter governor for determining whether to handle an item using the item handling parameters from the parameter estimator or the parameter explorer, wherein the parameter governor determines to employ the item handling parameters from the parameter explorer responsive to at least one of a lack of history of handling with the item, a lack of information about item properties that affect handling of the item, and wherein the parameter estimator, the parameter explorer, and the parameter governor are executed on a processing unit.

24. The method as claimed in claim 23, wherein the method further includes monitoring faults during item processing, the faults including any of picking task faults, transport faults, packing faults, identification faults, and case decanting faults.

25. The method as claimed in claim 23, wherein the adjustable item handling parameters for handling the item are chosen using optimization-based modeling involving sequential hypothesis testing.

26. The method as claimed in claim 25, wherein the adjustable item handling parameters for handling the item are chosen by Bayesian optimization involving recursively estimating a function being optimized.

* * * * *